(12) United States Patent
Chiang et al.

(10) Patent No.: US 11,924,413 B2
(45) Date of Patent: Mar. 5, 2024

(54) INTRA PREDICTION FOR MULTI-HYPOTHESIS

(71) Applicant: MediaTek Inc., Hsinchu (TW)

(72) Inventors: Man-Shu Chiang, Hsinchu (TW); Chih-Wei Hsu, Hsinchu (TW)

(73) Assignee: MediaTek Inc. (TW)

( * ) Notice: Subject to any disclaimer, the term of this patent is extended or adjusted under 35 U.S.C. 154(b) by 0 days.

(21) Appl. No.: 18/117,855

(22) Filed: Mar. 6, 2023

(65) Prior Publication Data

US 2023/0209048 A1 Jun. 29, 2023

Related U.S. Application Data

(62) Division of application No. 16/596,040, filed on Oct. 8, 2019, now abandoned.

(60) Provisional application No. 62/744,464, filed on Oct. 11, 2018.

(51) Int. Cl.
*H04N 7/12* (2006.01)
*H04N 19/105* (2014.01)
*H04N 19/11* (2014.01)
*H04N 19/117* (2014.01)
*H04N 19/136* (2014.01)
*H04N 19/159* (2014.01)
*H04N 19/176* (2014.01)
*H04N 19/189* (2014.01)
*H04N 19/507* (2014.01)

(52) U.S. Cl.
CPC ........... *H04N 19/11* (2014.11); *H04N 19/105* (2014.11); *H04N 19/117* (2014.11); *H04N 19/136* (2014.11); *H04N 19/159* (2014.11); *H04N 19/176* (2014.11); *H04N 19/189* (2014.11); *H04N 19/507* (2014.11)

(58) Field of Classification Search
CPC .......................... H04N 19/159; H04N 19/507
See application file for complete search history.

(56) References Cited

U.S. PATENT DOCUMENTS

2007/0098067 A1  5/2007  Kim et al.

FOREIGN PATENT DOCUMENTS

| CN | 107113425 A | 8/2017 |
|---|---|---|
| CN | 107852492 A | 3/2018 |
| CN | 108141604 A | 6/2018 |

OTHER PUBLICATIONS

China National Intellectual Property Administration, First Office Action in China Patent Application No. 201980066554.2, dated Apr. 28, 2023.

*Primary Examiner* — Y Lee
(74) *Attorney, Agent, or Firm* — Han IP PLLC; Andy M. Han

(57) ABSTRACT

A video decoder that decodes a current block of pixels by using multi-hypothesis combined prediction mode is provided. The video decoder generates a first prediction of the current block based on an inter prediction mode. The video decoder enables the combined prediction mode for the current block based on a block size of the current block determined according to a width and a height of the current block. The combined prediction mode is disabled when the width of or the height of the current block is greater than a threshold length. When the combined prediction mode is enabled, the video decoder generates a second prediction based on an intra prediction mode that is inferred to be a planar mode, and subsequently a combined prediction for the current block based on the first prediction and the second prediction. The video decoder reconstructs the current block by using the combined prediction.

9 Claims, 16 Drawing Sheets

| Merge_index | L0 | L1 |
|---|---|---|
| 0 | mvL0_A, ref0 | - |
| 1 | - | mvL1_B, ref0 |
| 2 | | |
| 3 | | |
| 4 | | |

→

| Merge_index | L0 | L1 |
|---|---|---|
| 0 | mvL0_A, ref0 | - |
| 1 | - | mvL1_B, ref0 |
| 2 | mvL0_A, ref0 | mvL1_B, ref0 |
| 3 | | |
| 4 | | |

INTRA PREDICTION FOR MULTI-HYPOTHESIS

CROSS REFERENCE TO RELATED PATENT APPLICATION(S)

The present disclosure is part of a non-provisional application that claims the priority benefit of U.S. Provisional Patent Application No. 62/744,464, filed on 11 Oct. 2018. Contents of above-listed applications are herein incorporated by reference.

TECHNICAL FIELD

The present disclosure relates generally to video processing. In particular, the present disclosure relates to methods of coding a pixel block by using multiple hypothesis to perform inter prediction.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To determine the Merge index for the Skip and Merge modes, the Merge scheme is used to select a motion vector predictor among a Merge candidate set containing four spatial MVPs and one temporal MVP.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video decoder that decodes a current block of pixels by using multi-hypothesis (MH) combined prediction mode. The MH combined prediction mode includes at least one of MH mode for intra and MH mode for inter. The video decoder generates a first prediction of the current block based on an inter prediction mode. The video decoder enables the combined prediction mode for the current block based on a block size of the current block determined according to a width and/or a height of the current block. The combined prediction mode is disabled when the width of the current block or the height of the current block is greater than a threshold length. The threshold can be a fixed value or based on the max TU (e.g., 64) specified in the standard, or the maximum TU size (e.g., 64) specified in SPS/PPS/tile/tile group/slice level. When the combined prediction mode is enabled, the video decoder generates a second prediction based on an intra prediction mode or inter prediction mode and a combined prediction for the current block based on the first prediction and the second prediction. The video decoder reconstructs the current block by using the combined prediction.

In some embodiments, the video decoder performs a simplified intra prediction when generating the second prediction based on the intra prediction mode. The video decoder generates the second prediction by using the intra prediction mode to identify a set of neighboring pixels and applying an interpolation filter to the identified set of neighboring pixels to produce a set of interpolated pixels. In some embodiments, the set of interpolated pixels is used as the second prediction without further improvement. In some embodiments, the second prediction is computed without using position dependent intra prediction combination (PDPC) or angular intra prediction. When the intra prediction mode is planar mode, the second prediction is computed by omitting at least one of (i) reference availability check and substitution, (ii) reference sample filtering, (iii) horizontal planar predictor generation and averaging, and (iv) PDPC.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Inter-Prediction Modes

Figure 1:
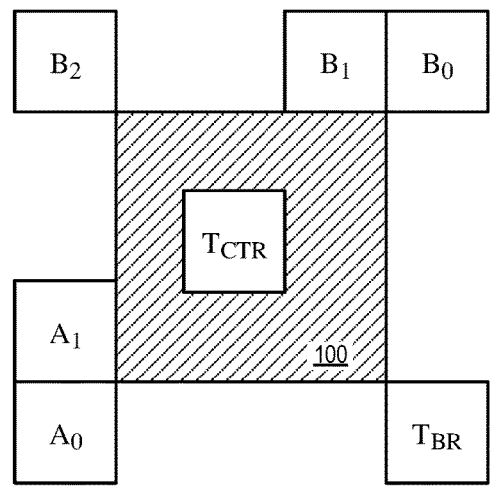
FIG. 1 shows the MVP candidates set for inter-prediction modes in HEVC.

FIG. 1 shows the MVP candidates set for inter-prediction modes in HEVC (i.e., skip, merge, and AMVP). The figure shows a current block 100 of a video picture or frame being encoded or decoded. The current block 100 (which can be a PU or a CU) refers to neighboring blocks to derive the spatial and temporal MVPs for AMVP mode, merge mode or skip mode.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 2:
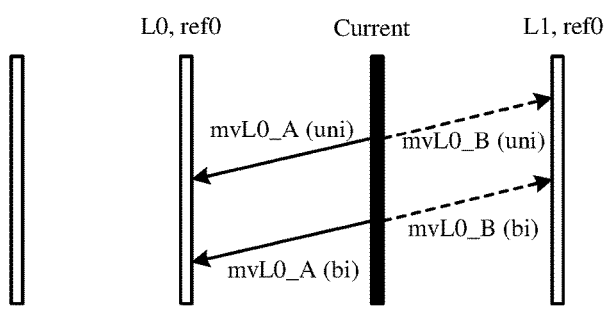
FIG. 2 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 2 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 3, 4:
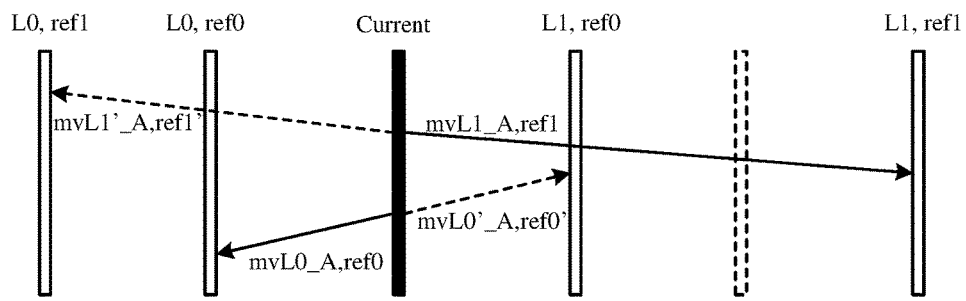
FIG. 3 illustrates a merge candidates list that includes scaled merge candidates.
FIG. 4 illustrates an example in which zero vector candidates are added to a merge candidates list or an AMVP candidates list.

For derived candidate type 2, scaled merge candidates are created by scaling original merge candidates. FIG. 3 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 4 illustrates an example in which zero vector candidates are added to a merge candidates list or an AMVP candidates list.

Intra-Prediction Mode

Intra-prediction method exploits one reference tier adjacent to the current prediction unit (PU) and one of the intra-prediction modes to generate the predictors for the current PU. The Intra-prediction direction can be chosen among a mode set containing multiple prediction directions. For each PU coded by Intra-prediction, one index will be used and encoded to select one of the intra-prediction modes. The corresponding prediction will be generated and then the residuals can be derived and transformed.

Figure 5:
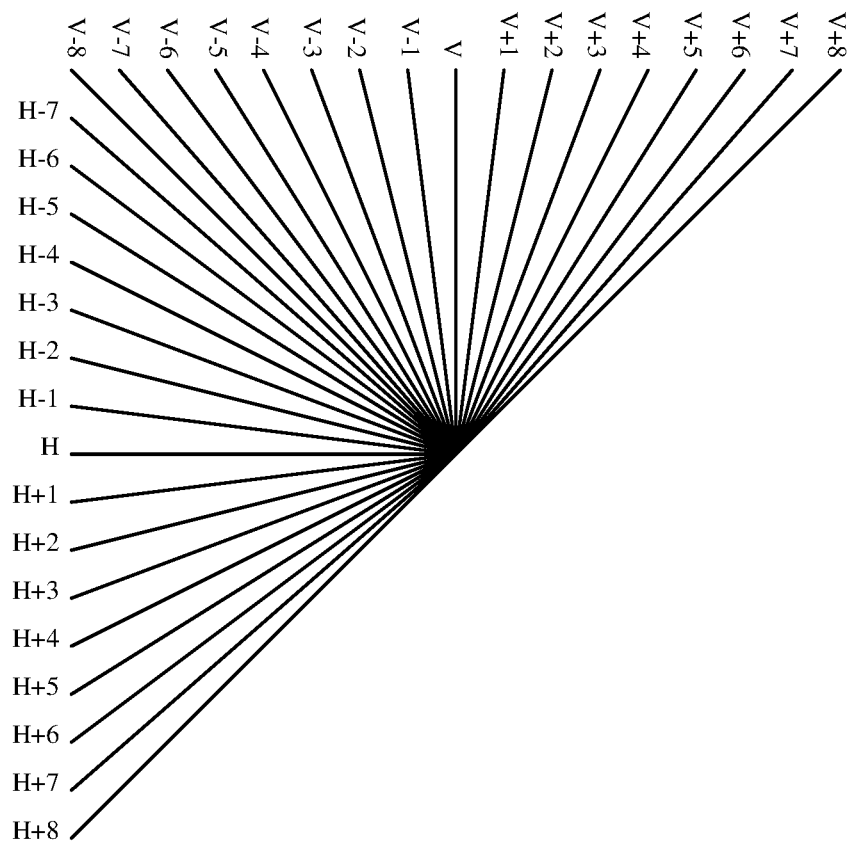
FIG. 5 shows the intra-prediction modes in different directions.

FIG. 5 shows the intra-prediction modes in different directions. These intra-prediction modes are referred to as directional modes and do not include DC mode or Planar mode. As illustrated, there are 33 directional modes (V: vertical direction; H: horizontal direction), so H, H+1~H+8, H−1~H−7, V, V+1~V+8, V−1~V−8 are used. Generally directional modes can be represented as either as H+k or V+k modes, where k=±1, ±2, . . . , ±8. (In some embodiments, intra-prediction mode has 65 directional modes so that the range of k is from ±1 to ±16.)

Out of the 35 intra-prediction modes in HEVC, 3 modes are considered as the most probable modes (MPM) for predicting the intra-prediction mode in current prediction block. These three modes are selected as an MPM set. For example, the intra-prediction mode used in the left prediction block and the intra-prediction mode used in the above prediction block are used as MPMs. When the intra-prediction modes in two neighboring blocks use the same intra-prediction mode, the intra-prediction mode can be used as an MPM. When only one of the two neighboring blocks is available and coded in directional mode, the two neighboring directions immediately next to this directional mode can be used as MPMs. DC mode and Planar mode are also considered as MPMs to fill the available spots in the MPM set, especially if the above or top neighboring blocks are not available or not coded in intra-prediction, or if the intra-prediction modes in neighboring blocks are not directional modes. If the intra-prediction mode for current prediction block is one of the modes in the MPM set, 1 or 2 bits are used to signal which one it is. Otherwise, the intra-prediction mode of the current block is not the same as any entry in the MPM set, and the current block will be coded as a non-MPM mode. There are all-together 32 such non-MPM modes and a (5-bit) fixed length coding method is applied to signal this mode.

In some embodiments, position dependent intra prediction combination (PDPC) is applied to some of the intra modes without signaling: planar, DC, horizontal, vertical, bottom-left angular mode and its x adjacent angular modes, and top-right angular mode and its x adjacent angular modes. The value x depends on the number of angular modes. Descriptions of PDPC can be found in: G. Van der Auwera, J. Heo, A. Filippov, "CE3: Summary Report on Intra Prediction and Mode Coding," 11th JVET Meeting, Ljubljana, SI, July 2018, JVET-K0023; ITU-T SG16/Q6 Doc. COM16-C1046, "Position Dependent intra Prediction Combination (PDPC)"; X. Zhao, V. Seregin, A. Said, M. Karczewicz, "EE1 related: Simplification and extension of PDPC", 8th JVET Meeting, Macau, October 2018, JVET-H0057; and M. Karczewicz et al., "Description of SDR, HDR and 360° video coding technology proposal by Qualcomm," 10th JVET Meeting, San Diego, CA, USA, April 2018, JVET-J0021.

Affine Merge Mode

Figure 6:
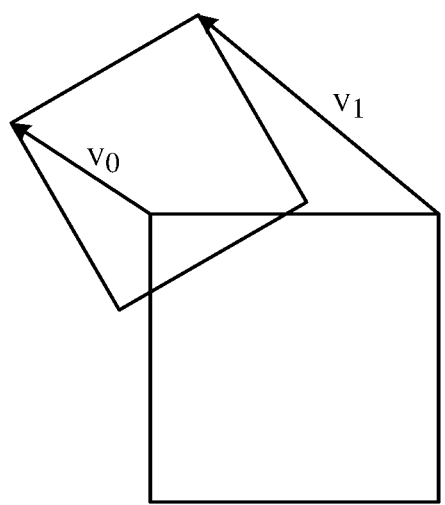
FIG. 6 illustrates a four parameter affine motion model.

HEVC uses only translation motion model for motion compensation prediction. There are many other types of motions in the real world, such as zoom-in and zoom-out, rotation, perspective motions, and other irregular motions. Some of these other types of motions may be represented by affine transformation or affine motion, which preserves points, straight lines and planes. An affine transformation does not necessarily preserve angles between lines or distances between points, but it does preserve ratios of distances between points lying on a straight line. When an affine motion block is moving, the motion vector field of the block can be described by two control point motion vectors or four parameters as the following:

The transformed block is a rectangular block. The motion vector field of each point in this moving block can be described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases}$$

Where $(v_{0x}, v_{0y})$ is the control point motion vector on top left corner, and $(v_{1x}, v_{1y})$ is another control point motion vector on above right corner of the block. In some embodiments, for a inter mode coded CU, when the CU size is equal to or larger than 16×16, an affine_flag is signaled to indicate whether the affine inter mode is applied or not. If the current CU is in affine inter mode, a candidate MVP pair list is built using the neighbor valid reconstructed blocks. FIG. 6 illustrates a four parameter affine motion model.

Figure 7:
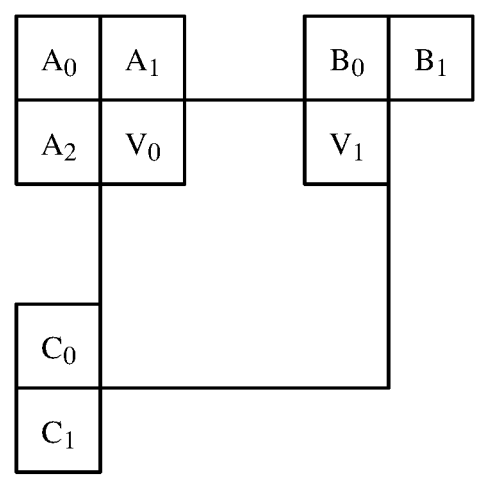
FIG. 7 illustrates MVP derivation for affine inter mode.

FIG. 7 illustrates MVP derivation for affine inter mode. As shown in FIG. 7, the $v_0$ is selected from the motion vectors of the block $A_0$, $A_1$ or $A_2$, and the $v_1$ is selected from the motion vectors of the block $B_0$ and $B_1$. The index of candidate MVP pair is signaled in the bit stream. The MV difference (MVD) of the two control points are coded in the bitstream.

In some embodiments, if the current PU is a merge PU, the neighboring five blocks (C0, B0, B1, C1, and A0 blocks in FIG. 7) are checked whether one of them is affine inter mode or affine merge mode. If yes, an affine_flag is signaled to indicate whether the current PU is affine mode. When the current PU is coded in affine merge mode, the first block is coded by affine mode from valid neighbor reconstructed blocks. The selection order for the candidate block is from left, above, above right, left bottom to above left (C0→B0→B1→C1→A0) as shown in FIG. 7. The affine parameter of the first affine coded block is used to derive the $v_0$ and $v_1$ for the current PU.

Ultimate Motion Vector Expression (UMVE)

In some embodiments, ultimate motion vector expression (UMVE) is used for either skip or merge modes. When a candidate is selected from among the merge candidates, the expression of the selected candidate is expanded under UMVE. UMVE provides a motion vector expression with simplified signaling. The UMVE motion vector expression includes prediction direction information, starting point, motion magnitude, and motion direction.

In some embodiments, a merge candidate list is used as it is. However, candidates that are default merge type (MRG_TYPE_DEFAULT_N) are considered for UMVE's expansion. In UMVE expansion, the Prediction direction information indicates a prediction direction among L0, L1, and L0 and L1 predictions. In B slice, the bi-prediction candidates can be generated from merge candidates with uni-prediction by using mirroring technique. For example, if a merge candidate is uni-prediction with L1, a reference index of L0 is decided by searching a reference picture in list 0, which is mirrored with the reference picture for list 1. If there is no corresponding picture, the nearest reference picture to the current picture is used. L0' MV is derived by scaling L1's MV. The scaling factor is calculated by picture order count (POC) distance.

If the prediction direction of the UMVE candidate is the same with one of the original merge candidates, the index with value 0 is signaled as an UMVE prediction direction. But, if not the same (same with one of the original merge candidates), the index with value 1 is signaled. After sending first bit, remaining prediction direction is signaled based on the pre-defined priority order of UMVE prediction direction. Priority order is L0/L1 prediction, L0 prediction and L1 prediction. If the prediction direction of merge candidate is L1, signaling '0' is for UMVE' prediction direction L1. Signaling '10' is for UMVE' prediction direction L0 and L1. Signaling '11' is for UMVE' prediction direction L0. If L0 and L1 prediction lists are same, UMVE's prediction direction information is not signaled.

Base candidate index defines the starting point. Base candidate index indicates the best candidate among candidates in the list as follows.

TABLE 1

Base candidate Index

| Base candidate IDX | 0 | 1 | 2 | 3 |
|---|---|---|---|---|

TABLE 2

Distance Index

| Distance IDX | 0 | 1 | 2 | 3 | 4 | 5 | 6 | 7 |
|---|---|---|---|---|---|---|---|---|
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

Direction IDX

| Direction IDX | 00 | 01 | 10 | 11 |
|---|---|---|---|---|
| x-axis | + | — | N/A | N/A |
| y-axis | N/A | N/A | + | — |

In some embodiments, to reduce encoder complexity, block restriction is applied. For example, if either width or height of a CU is less than 4, UMVE is not performed.

Multi-Hypothesis Mode

Some embodiments of the disclosure provide a Multi-hypothesis mode to improve Inter prediction, which is an improved method for Skip and/or Merge modes. In original Skip and Merge mode, one Merge index is used to select one motion candidate, which may be either uni-prediction or bi-prediction derived by the candidate itself, from the Merge candidate list. The generated motion compensated predictor is referred to as the first hypothesis (or first prediction) in some embodiments. Under Multi-hypothesis mode, a second hypothesis is produced in addition to the first hypothesis. The second hypothesis of predictors can be generated by motion compensation from a motion candidate based on an inter prediction mode, (e.g., Merge or Skip modes), or by intra prediction based on an intra prediction mode.

When Multi-hypothesis mode is supported, one or more Multi-hypothesis candidate(s) may be available for Skip and/or Merge mode. When the second hypothesis (or second prediction) is generated by an Intra prediction mode, the Multi-hypothesis mode is referred to as MH mode for Intra or MH mode Intra or MH Intra. When the second hypothesis is generated by motion compensation by a motion candidate or an inter prediction mode (e.g., Merge or Skip mode), the Multi-hypothesis mode is referred to as MH mode for Inter or MH mode Inter or MH Inter (or also called as MH mode for Merge or MH Merge).

For Multi-hypothesis mode, each Multi-hypothesis candidate (or called each candidate with Multi-hypothesis) contains one motion candidate (i.e., first hypothesis) and one prediction mode (i.e., second hypothesis), where the motion candidate is selected from Candidate List I and the prediction mode is selected from Candidate List II. For some embodiments for MH mode for intra, each Multi-hypothesis candidate (or called each candidate with Multi-hypothesis) contains one motion candidate and one Intra prediction mode, where the motion candidate is selected from Candidate List I and the intra prediction mode is selected from Candidate List II. That is, one motion candidate may match one or more intra prediction mode(s) at the encoder (or one or more motion candidates may match one intra prediction mode at the encoder); and through encoding mode decision, one motion candidate and one intra prediction mode is decided and signaled to the decoder.

For some embodiments for MH mode for Inter, each Multi-hypothesis candidate contains two motion candidates and at least one of the two motion candidates are selected from Candidate List I. In some embodiments, Candidate List I is identical to the Merge candidates list of the current block and that both motion candidates of a Multi-hypothesis candidate of MH mode for inter are selected from Candidate List I. In some embodiments, the Candidate List I is a subset of the Merge candidate list. In some embodiments, one of the motion candidates of a Multi-hypothesis candidate is selected from the Merge candidate list and another one of the motion candidates of the same Multi-hypothesis candidate is selected from Candidate List I.

Figure 8A:
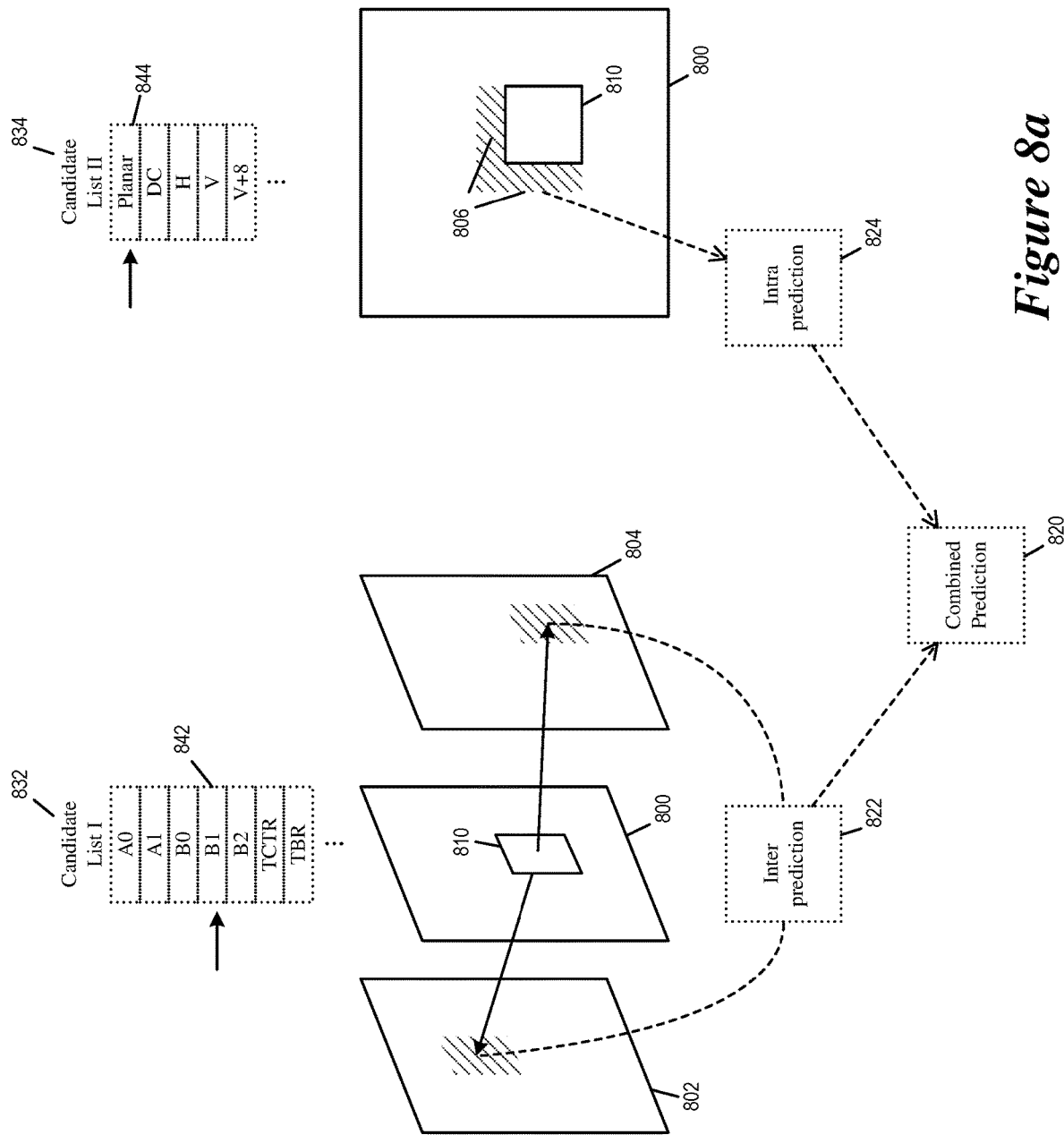
FIG. 8a conceptually illustrates encoding or decoding a block of pixels by using Multi-hypothesis mode for Intra.

FIG. 8a conceptually illustrate encoding or decoding a block of pixels by using MH Mode for Intra. The figure illustrates a video picture 800 that is currently being encoded or decoded by a video coder. The video picture 800 includes a block of pixels 810 that is currently being encoded or decoded as a current block. The current block 810 is coded by MH mode for intra, specifically, a combined prediction 820 is generated based on a first prediction 822 (first hypothesis) of the current block 810 and a second prediction 824 (second hypothesis) of the current block 810. The combined prediction 820 is then used to reconstruct the current block 810.

The current block 810 being coded by using MH mode for Intra. Specifically, the first prediction is obtained by inter-prediction based on at least one of reference frames 802 and 804. The second prediction is obtained by intra-prediction based on neighboring pixels 806 of the current block 810. As illustrated, the first prediction 822 is generated based on an inter-prediction mode or a motion candidate 842 (first prediction mode) that is selected from a first candidate list 832 (Candidate List I) comprising one or more candidate inter-prediction modes. The second prediction 824 is generated based on an intra-prediction mode 844 (second prediction mode) that is selected from a second candidate list 834 (Candidate List II) comprising one or more candidate intra-prediction modes.

Figure 8B:
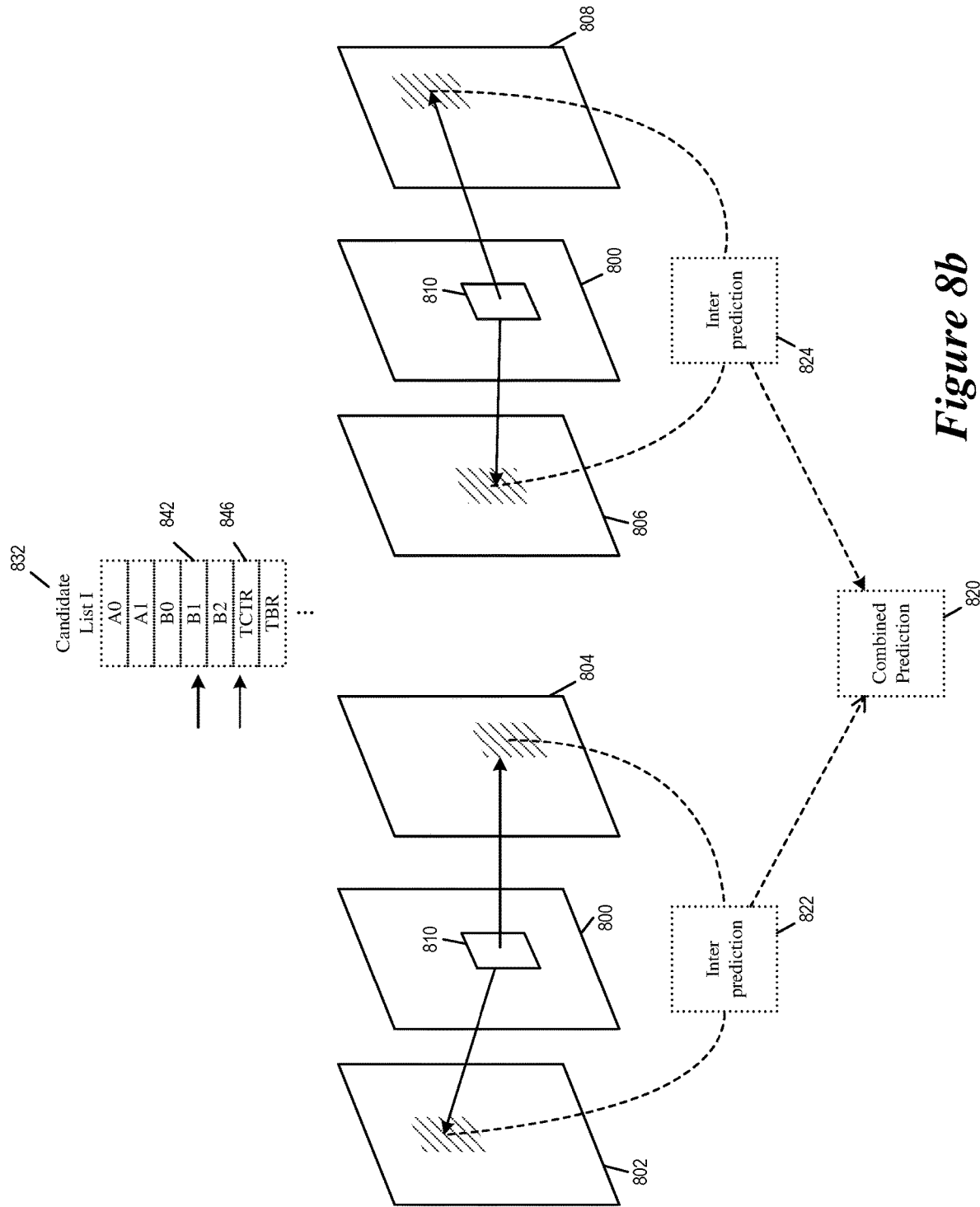
FIG. 8b conceptually illustrates encoding or decoding a block of pixels by using Multi-hypothesis mode for Inter.

FIG. 8b illustrates the current block 810 being coded by using MH mode for Inter. Specifically, the first prediction 822 is obtained by inter-prediction based on at least one of reference frames 802 and 804. The second prediction 824 is obtained by inter-prediction based on at least one of reference frames 806 and 808. As illustrated, the first prediction 822 is generated based on an inter-prediction mode or a motion candidate 842 (first prediction mode) that is selected from the first candidate list 832 (Candidate List I). The second prediction 824 is generated based on an inter-prediction mode or a motion candidate 846 (second prediction mode) that is also selected from the first candidate list 832 (Candidate List I).

In some embodiments, when MH mode for Intra is supported, one flag is signaled (for example, to represent whether MH mode for Intra is applied). Such a flag may be represented or indicated by a syntax element in a bitstream. In some embodiment, if the flag is on, one additional Intra mode index is signaled to indicate the Intra prediction mode from Candidate List II. In some embodiment, if the flag is on, the intra prediction mode for MH mode for intra is implicitly selected from Candidate List II.

In some embodiments, for MH mode for Intra or MH mode for Inter, the indices that are used to select the first prediction mode and the second prediction mode are separately and distinctly signaled, e.g., as two syntax elements in a bitstream that encodes the video picture 800. For example, a first syntax element may be used to indicate the selection of the first candidate 842 from the first candidate list 832 and a second syntax element may be used to indicate the selection of the second candidate 844 from the second candidate list 834 (or the first candidate list 832).

In some embodiments, for MH mode for Intra, the indices that are used to select the first prediction mode is signaled, e.g., as one syntax elements in a bitstream that encodes the video picture 800. For example, a first syntax element may be used to indicate the selection of the first candidate 842 from the first candidate list 832 and the second candidate 844 from the second candidate list 834 (or the first candidate list 832) is decided implicitly.

In some embodiments, different variance of MH mode for intra or MH mode for inter may be implemented by the video coder according to the different settings such as supported-mode setting, combined-weight setting, intra mode settings, block size settings, and any combination of above. The selection of a MH mode for Intra or MH mode for inter setting can be implicitly derived by the block width and/or block height or be explicitly indicated by a flag signaled at CU level, CTU level, slice level, tile level, tile group, SPS level, or PPS level or be any combination of above.

Supported-Mode Settings

A hypothesis of intra prediction or inter prediction may be combined with a hypothesis of inter prediction from different inter modes (that are identified by the supported-mode setting). In some embodiments, one hypothesis of inter prediction can be generated from any one of existing inter modes, such as skip, merge, AMVP, affine merge, affine AMVP, or sub-block merge. In some embodiments, MH mode for intra can support an improved inter mode. For example, UMVE candidates can be used to generate one hypothesis of inter prediction. For another example, the motion information used to generate a hypothesis of inter prediction can be acquired through referencing previous coded motion information in a history-based scheme (or called as history-based motion vector prediction (HMVP)). HMVP candidate is defined as the motion information of a previously coded block. A table with multiple HMVP candidates is maintained during the encoding/decoding process. The table is emptied when a new slice is encountered.

Combined-Weight Settings:

Weightings are used to combine the multiple hypotheses of prediction for MH mode for intra or MH mode for inter (e.g., for computing a weighted sum of the first hypothesis of prediction and the second hypothesis of prediction as the combined prediction). The weightings may be fixed at a particular value or may vary with the block width or block height or a predefined lookup table. For example, an equal weighting can be applied to multiple hypotheses of prediction.

Intra Mode Settings:

Candidate List II can be determined according to intra mode setting. When the size of Candidate List II (the number of candidates in the list) is equal to one, the selected intra mode can be inferred to be the only one available intra prediction mode in the Candidate List II without signaling. For example, Candidate List II may include only planar mode, and the selected intra mode is inferred to be planar mode.

In some embodiments, Candidate List II consists of any one or any combination of {Planar, DC, horizontal, Diagonal} or any one or any combination of {Planar, DC, horizontal, Diagonal}±offset, where the offset is an integer. In some embodiments, (the candidates of the) Candidate List II varies with the block size or block width or block height. In some embodiments, planar mode is absent from Candidate List II. Any combination of above can be applied to MH mode for intra. In one example, when the block size is smaller than a particular threshold, denoted as T, where T can be 4×4, 8×8, 16×16, 32×32, Candidate List II includes more than one intra prediction modes, which can be any combination of {Planar, DC, horizontal, Diagonal} or any combination of {Planar, DC, horizontal, Diagonal}±offset. In another example, when the block size is larger than a particular threshold, denoted as T, where T can be 4×4, 8×8, 16×16, 32×32, Candidate List II may include any one or any combination of {DC, horizontal, Diagonal} or any one or any combination of {DC, horizontal, Diagonal}±offset. One benefit of removing planar mode from Candidate List II for larger blocks is to reduce the size of a buffer that is used to generate the hypothesis of intra prediction. The threshold can be a fixed value or based on the max TU (e.g. 64) specified in the standard, or the maximum TU size (e.g. 64) specified (for example, parsed or signaled) in SPS/PPS/tile/tile group/slice level.

In some embodiments, the intra prediction process of MH mode for intra can be aligned with or identical to the intra prediction process for normal intra mode (normal intra mode being an intra mode that is not to be combined with inter prediction as part of multi-hypothesis prediction or normal intra mode being an intra mode described in the section: intra-prediction mode). In some embodiment, the intra prediction process of MH mode for intra can be a simplified version of the intra prediction process of normal intra modes. The simplification scheme (or the simplified intra prediction process of MH mode for intra) may omit (at least some of) the filtering process, reduce the length of intra interpolation filter, omit the tools for improving intra prediction such as PDPC, wide angular intra prediction (proposed in JVET-K0500), etc. For example, a simplified planar mode (for simplified intra prediction) may apply part (or a subset) or none of these four planar prediction steps: (1) reference sample availability check and substitution, (2) reference sample filtering, (3) horizontal and vertical planar predictor generation and averaging, and (4) PDPC, whereas normal planar mode may include all four planar prediction steps.

Block Size Settings:

Multi-hypothesis mode (for example, MH mode for intra and/or MH mode for inter) may be enabled according to the block width and/or block height of the current block. In some embodiments, MH mode for intra can be disabled (or called forbidden) for a block with size larger than a particular threshold such as 4×4, 8×8, 16×16, 32×32, 64×64, or 128×128. One benefit of disabling or forbidding MH mode for intra for larger blocks is to reduce the size of a buffer for generating the hypothesis of intra prediction. In some embodiments, MH mode for intra can be disabled (or called forbidden) for a block with size smaller than a particular threshold such as 4×4, 8×8, 16×16, or 32×32. (In other words, MH mode for Intra can be enabled for a bock with size larger than or equal to the particular threshold such as 4×4, 8×8, 16×16, or 32×32). In some embodiment, MH mode for intra can be disabled (or called forbidden) for the block with the block width larger than N and/or the block height larger than M, where N and M can be 4, 8, 16, 32, 64, or 128. Any combination of above can be applied to MH mode for intra. In some embodiments, N×M can be represented as a block size threshold generated by the result of N×M. For example, for when the block area is larger than 16, 32, 64, 128, 256, 512, or 1024, MH mode for Intra or MH mode for Inter is disabled (or called forbidden). For example, for the block area smaller than 16, 32, 64, 128, 256, 512, or 1024, MH mode for Intra or MH mode for inter is disabled (or called forbidden). In some embodiment, the proposed block size setting can be used for MH mode for inter. In some embodiments, when MH mode for intra or MH mode for inter is disabled (or called forbidden), the syntax (e.g. a flag indicating whether the current block is encoded using MH mode for intra in the encoded video data) for the disabled mode (which can be MH mode for intra or MH mode for inter) is not signaled at encoder and not parsed at decoder. In some embodiments, when the syntax (e.g. a flag indicating whether the current block is encoded using MH mode for intra in the encoded video data) for the disabled mode (which can be MH mode for intra or MH mode for inter) is not signaled at encoder and not parsed at decoder, the syntax is inferred to be false and the disabled mode is not applied.

Figure 9:
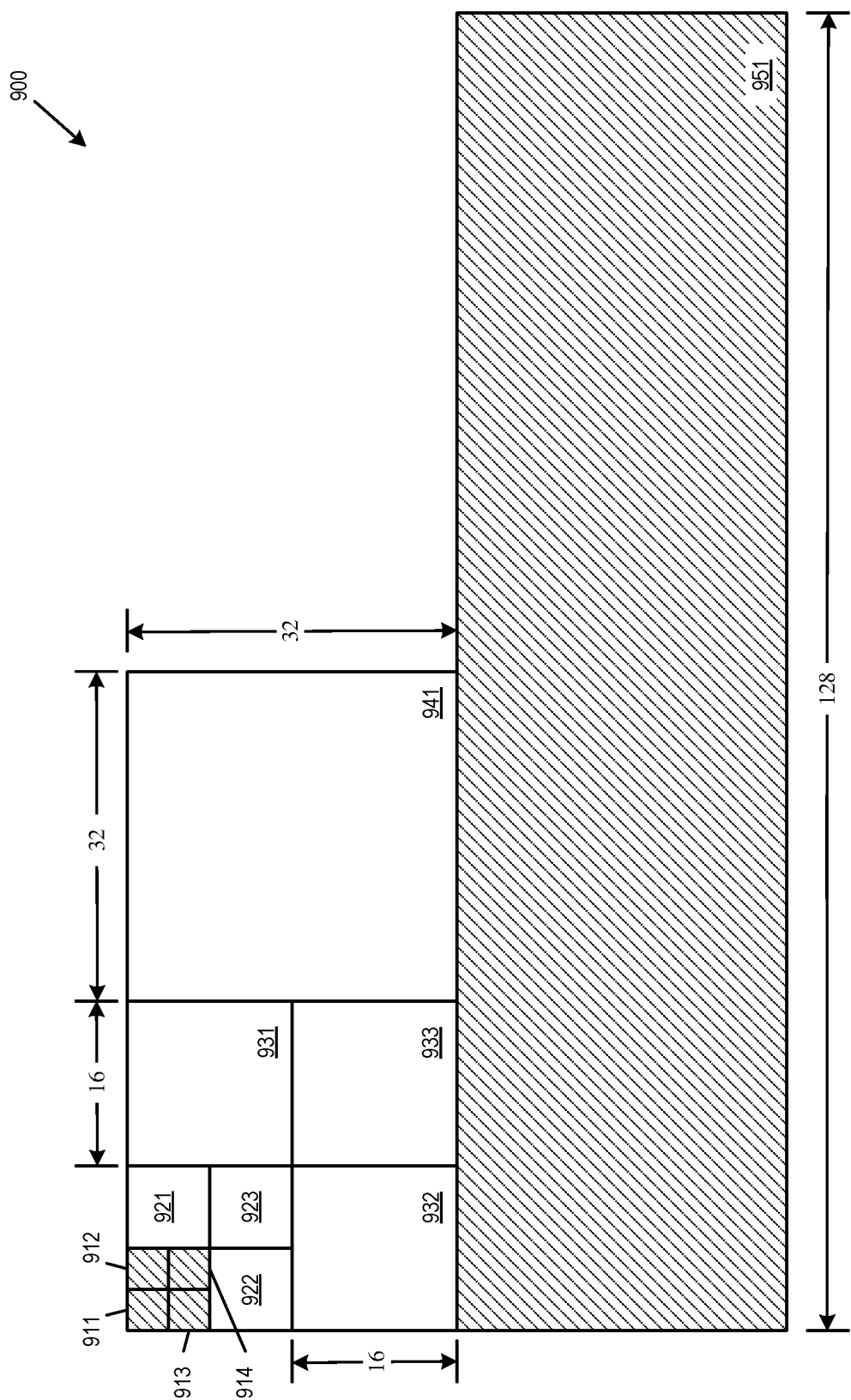
FIG. 9 conceptually illustrates enabling MH mode for Intra or MH mode for inter based on size, width, or height of pixel blocks.

FIG. 9 conceptually illustrates enabling Multi-hypothesis mode (for example, MH mode for Intra and/or MH mode for inter) based on size, width, or height of pixel blocks. A video coder is encoding or decoding a video picture 900. The video picture 900 is partitioned into blocks of various sizes, including 4×4 blocks 911-914, 8×8 blocks 921-923, 16×16 blocks 931-933, a 32×32 block 941, and a 128×32 block 951.

Some of the blocks are CUs or PUs that are split from a larger CU by quad splitting, binary splitting, ternary splitting, etc. The video coder determines a block size of the current block according to a width of the current block, a height of the current block or both. In some embodiments, the video coder enables MH mode for Intra (or MH mode for inter) for the current block based on the block size of the current block. MH mode for Intra (or MH mode for inter) is disabled when the width of the block is greater than a threshold width or when the height of the block is greater than a threshold height. In some embodiments, MH mode for Intra (or MH mode for inter) is disabled when the width or the height of the block is greater than a threshold length.

The video coder enables Multi-hypothesis mode (for example, MH mode for Intra and/or MH mode for inter) for coding a block if the size of the block is 8×8. Take the MH mode for Intra for example, the MH mode for Intra has an enabling threshold of block size 64. The video coder disables MH mode for Intra (or MH mode for inter) for coding the block if the width or the height of the block is greater than 64, e.g., the MH mode for Intra has a disabling threshold length, width, or height >64. Blocks for which MH mode for intra is enabled are illustrated as unshaded, while blocks for which MH mode for intra is disabled are illustrated as shaded. As illustrated, blocks 911-914 are not coded by MH mode for intra because their widths and heights do not result in a block size larger than or equal to the enabling threshold of 8×8 or 64. Blocks 921-923, 931-933, and 941 have sizes that meet the enabling threshold of 64, so MH mode for Intra may be enabled for coding these blocks. The Block 951 has a width 128 that is larger than the disabling threshold of 64, so MH mode for Intra is disabled for coding the block 951.

Any of the foregoing proposed methods can be implemented in encoders and/or decoders. For example, any of the proposed methods can be implemented in an inter coding module or intra coding module of an encoder, a motion compensation module, a merge candidate derivation module of a decoder. Alternatively, any of the proposed methods can be implemented as a circuit coupled to the inter coding module or intra coding module of an encoder and/or motion compensation module, a merge candidate derivation module of the decoder.

Example Video Encoder

Figure 10:
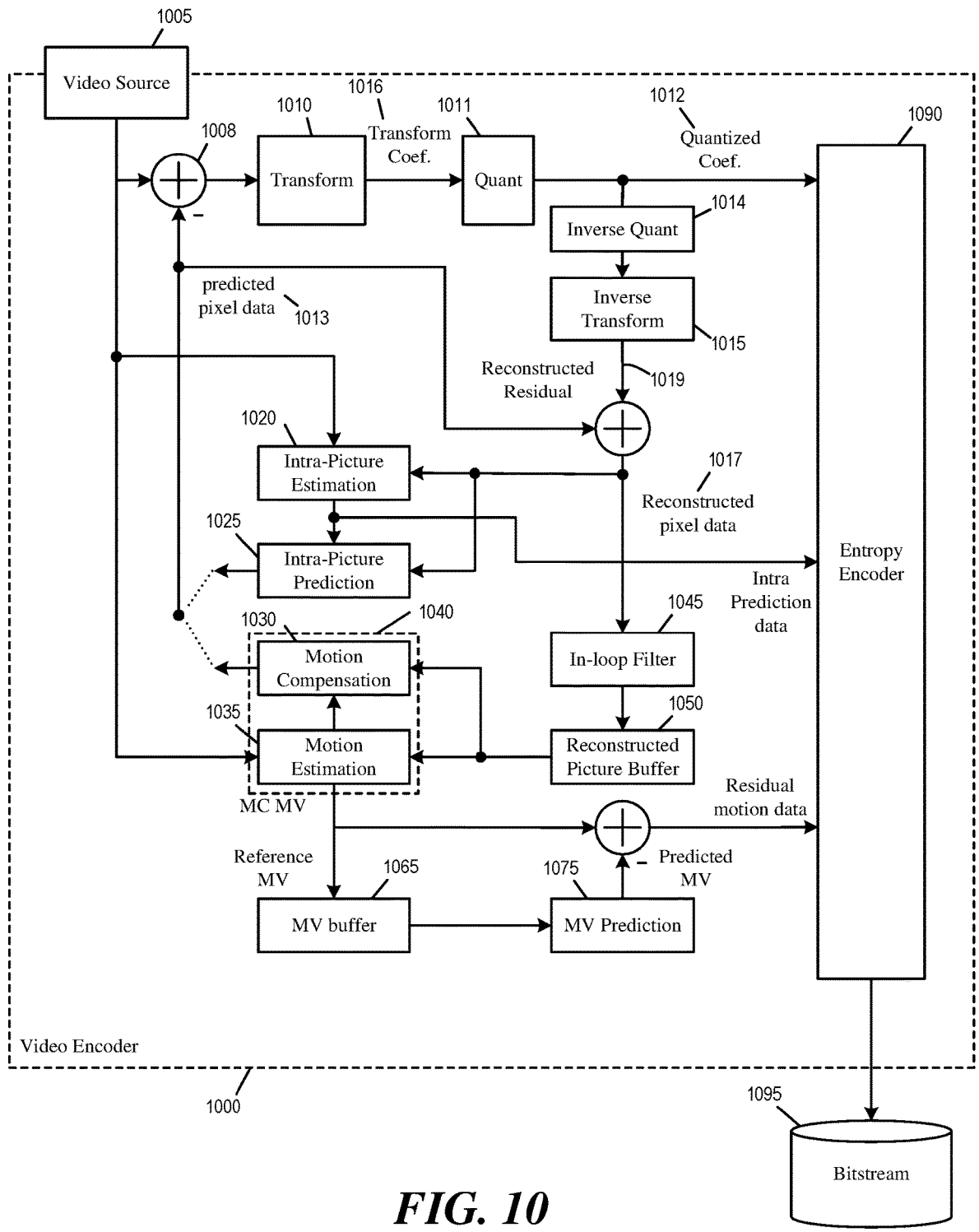
FIG. 10 illustrates an example video encoder that may implement MH mode for intra or MH mode for inter.

FIG. 10 illustrates an example video encoder 1000 that may implement MH mode (MH mode for Intra and/or MH mode for Inter). As illustrated, the video encoder 1000 receives input video signal from a video source 1005 and encodes the signal into bitstream 1095. The video encoder 1000 has several components or modules for encoding the signal from the video source 1005, including at least part of a transform module 1010, a quantization module 1011, an inverse quantization module 1014, an inverse transform module 1015, an intra-picture estimation module 1020, an intra-prediction module 1025, a motion compensation module 1030, a motion estimation module 1035, an in-loop filter 1045, a reconstructed picture buffer 1050, a MV buffer 1065, and a MV prediction module 1075, and an entropy encoder 1090. The motion compensation module 1030 and the motion estimation module 1035 are part of an inter-prediction module 1040.

In some embodiments, the modules 1010-1090 are modules of software instructions being executed by one or more processing units (e.g., a processor) of a computing device or electronic apparatus. In some embodiments, the modules 1010-1090 are modules of hardware circuits implemented by one or more integrated circuits (ICs) of an electronic apparatus. Though the modules 1010-1090 are illustrated as being separate modules, some of the modules can be combined into a single module.

The video source 1005 provides a raw video signal that presents pixel data of each video frame without compression. A subtractor 1008 computes the difference between the raw video pixel data of the video source 1005 and the predicted pixel data 1013 from the motion compensation module 1030 or intra-prediction module 1025. The transform module 1010 converts the difference (or the residual pixel data or residual signal 1009) into transform coefficients (e.g., by performing Discrete Cosine Transform (DCT), Discrete Sine Transform (DST) or any other transform function). The quantization module 1011 quantizes the transform coefficients into quantized data (or quantized coefficients) 1012, which is encoded into the bitstream 1095 by the entropy encoder 1090.

The inverse quantization module 1014 de-quantizes the quantized data (or quantized coefficients) 1012 to obtain transform coefficients, and the inverse transform module 1015 performs inverse transform on the transform coefficients to produce reconstructed residual 1019. The reconstructed residual 1019 is added with the predicted pixel data 1013 to produce reconstructed pixel data 1017. In some embodiments, the reconstructed pixel data 1017 is temporarily stored in a line buffer (not illustrated) for intra-picture prediction and spatial MV prediction. The reconstructed pixels are filtered by the in-loop filter 1045 and stored in the reconstructed picture buffer 1050. In some embodiments, the reconstructed picture buffer 1050 is a storage external to the video encoder 1000. In some embodiments, the reconstructed picture buffer 1050 is a storage internal to the video encoder 1000.

The intra-picture estimation module 1020 performs intra-prediction based on the reconstructed pixel data 1017 to produce intra prediction data. The intra-prediction data is provided to the entropy encoder 1090 to be encoded into bitstream 1095. The intra-prediction data is also used by the intra-prediction module 1025 to produce the predicted pixel data 1013.

The motion estimation module 1035 performs inter-prediction by producing MVs to reference pixel data of previously decoded frames stored in the reconstructed picture buffer 1050. These MVs are provided to the motion compensation module 1030 to produce predicted pixel data.

Instead of encoding the complete actual MVs in the bitstream, the video encoder 1000 uses MV prediction to generate predicted MVs, and the difference between the MVs used for motion compensation and the predicted MVs is encoded as residual motion data and stored in the bitstream 1095.

The MV prediction module 1075 generates the predicted MVs based on reference MVs that were generated for encoding previously video frames, i.e., the motion compensation MVs that were used to perform motion compensation. The MV prediction module 1075 retrieves reference MVs from previous video frames from the MV buffer 1065. The video encoder 1000 stores the MVs generated for the current video frame in the MV buffer 1065 as reference MVs for generating predicted MVs.

The MV prediction module 1075 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1095 by the entropy encoder 1090.

The entropy encoder 1090 encodes various parameters and data into the bitstream 1095 by using entropy-coding techniques such as context-adaptive binary arithmetic coding (CABAC) or Huffman encoding. The entropy encoder 1090 encodes various header elements, flags, along with the quantized transform coefficients 1012, and the residual motion data as syntax elements into the bitstream 1095. The bitstream 1095 is in turn stored in a storage device or transmitted (for example, transmitted to a decoder over a communications medium such as a network).

The in-loop filter 1045 performs filtering or smoothing operations on the reconstructed pixel data 1017 to reduce the artifacts of coding, particularly at boundaries of pixel blocks. In some embodiments, the filtering operation performed includes deblocking or sample adaptive offset (SAO). In some embodiment, the filtering operations include adaptive loop filter (ALF).

Figure 11A:
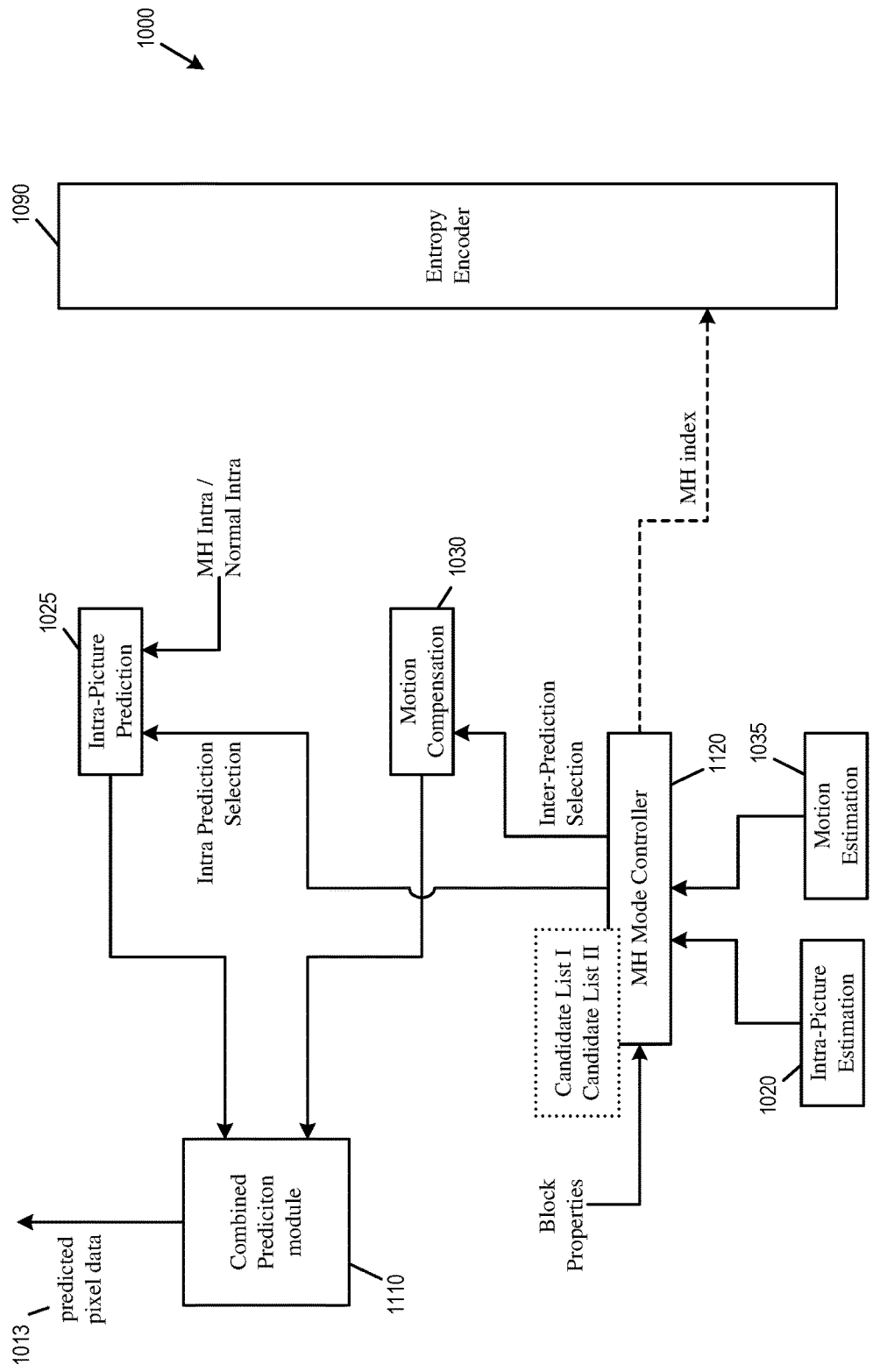
FIG. 11a illustrates portions of the video encoder that may implement MH mode for intra when encoding a block of pixels.

FIG. 11a illustrates portions of the video encoder 1000 that may implement MH mode for intra when encoding a block of pixels. As illustrated, the video encoder 1000 implements a combined prediction module 1110, which produces the predicted pixel data 1013. The combined prediction module 1110 receives intra-prediction values generated by the intra-picture prediction module 1025. The combined prediction module 1110 also receives inter-prediction values from the motion compensation module 1030. The motion information and mode directions used for encoding a pixel block by the motion compensation module 1030 and the intra-picture prediction module 1025 are saved in a storage for use by the same modules for subsequent blocks as candidates for merge mode or MH mode for intra.

A MH mode controller 1120 controls the operations of the intra-picture prediction module 1025 and the motion compensation module 1030 when MH mode for Intra is enabled (for the block or a portion of the block). The MH mode controller 1120 determines a list of inter-prediction modes (Candidate List I) and a list of intra-prediction modes (Candidate List II). The candidates of each list are determined or identified based on various factors, including the size, width, or height of the current block, and/or a direction of a corresponding motion candidate. The MH mode controller 1120 may also enable or disable MH mode for intra based on size, width, or height of the current block by enabling or disabling one or both of the intra prediction module 1025 and the motion compensation module 1030. In some embodiments, the intra prediction module 1025 uses a buffer whose size is reduced based on a threshold block width or height of for disabling MH mode for intra.

The MH mode controller 1120 selects an inter-prediction candidate from Candidate List I and an intra-prediction candidate from Candidate List II. The motion compensation module 1030 performs inter-prediction based on the candidate selected from Candidate List I. The intra-picture prediction module 1025 performs intra prediction based on the candidate selected from Candidate List II. The results of the inter-prediction and intra-prediction are combined (e.g., averaged) at the combined prediction module 1110 to generate the predicted pixel data 1013.

The MH mode controller also provides information to the entropy encoder 1090 to insert into the bitstream as syntax elements. Such syntax elements may signal whether MH mode for Intra is turned on. Such syntax elements may also explicitly signal the selection of the inter-prediction and intra-prediction candidates from candidate lists I and II for MH mode for intra. The syntax for signaling the selection of the inter-prediction and intra-prediction candidates may include one single index that selects the inter-prediction and intra-prediction candidates from one combined list that includes both Candidate list I and Candidate List II. The syntax for signaling the selection of the intra-prediction candidates and/or the inter-prediction candidate may be omitted (implicit signaling) if Candidate List I or Candidate List II has only one candidate.

The intra prediction module 1025 generates intra prediction result by using the selected intra prediction mode to identify a set of neighboring pixels and applying an interpolation filter to the identified set of neighboring pixels to produce a set of interpolated pixels. A signal (labeled as MH Intra/Normal Intra) controls whether the intra prediction module 1025 is used to generate intra prediction result for MH mode for intra or for normal intra prediction.

When the intra prediction module 1025 is used to produce intra prediction result for regular or normal intra prediction (i.e., not part of MH mode for intra, or described in section intra-prediction mode), tools for improving intra prediction such as PDPC and wide angular intra prediction may also be used. For example, when the selected intra prediction mode is planar mode, for normal intra prediction, the intra prediction module 1025 may also perform reference availability check and substitution, reference sample filtering, horizontal planar predictor generation and averaging, and PDPC.

On the other hand, when the intra prediction module 1025 is used to generate intra prediction result for MH mode for intra, the intra prediction module 1025 performs a simplified intra prediction process. Such a simplified process may omit (at least some of) the filtering process, reduce the length of intra interpolation filter (e.g., having three or less taps instead of four taps), omit the tools for improving intra prediction such as PDPC, and wide angular intra prediction, etc. The simplified intra prediction process may compute planar mode by applying only a part (or a subset) or none of the four planar prediction steps (reference availability check and substitution, reference sample filtering, horizontal planar predictor generation and averaging, and PDPC). In some embodiments, the set of interpolated pixels is used as the result of intra prediction without further improvement for MH mode for intra.

Figure 11B:
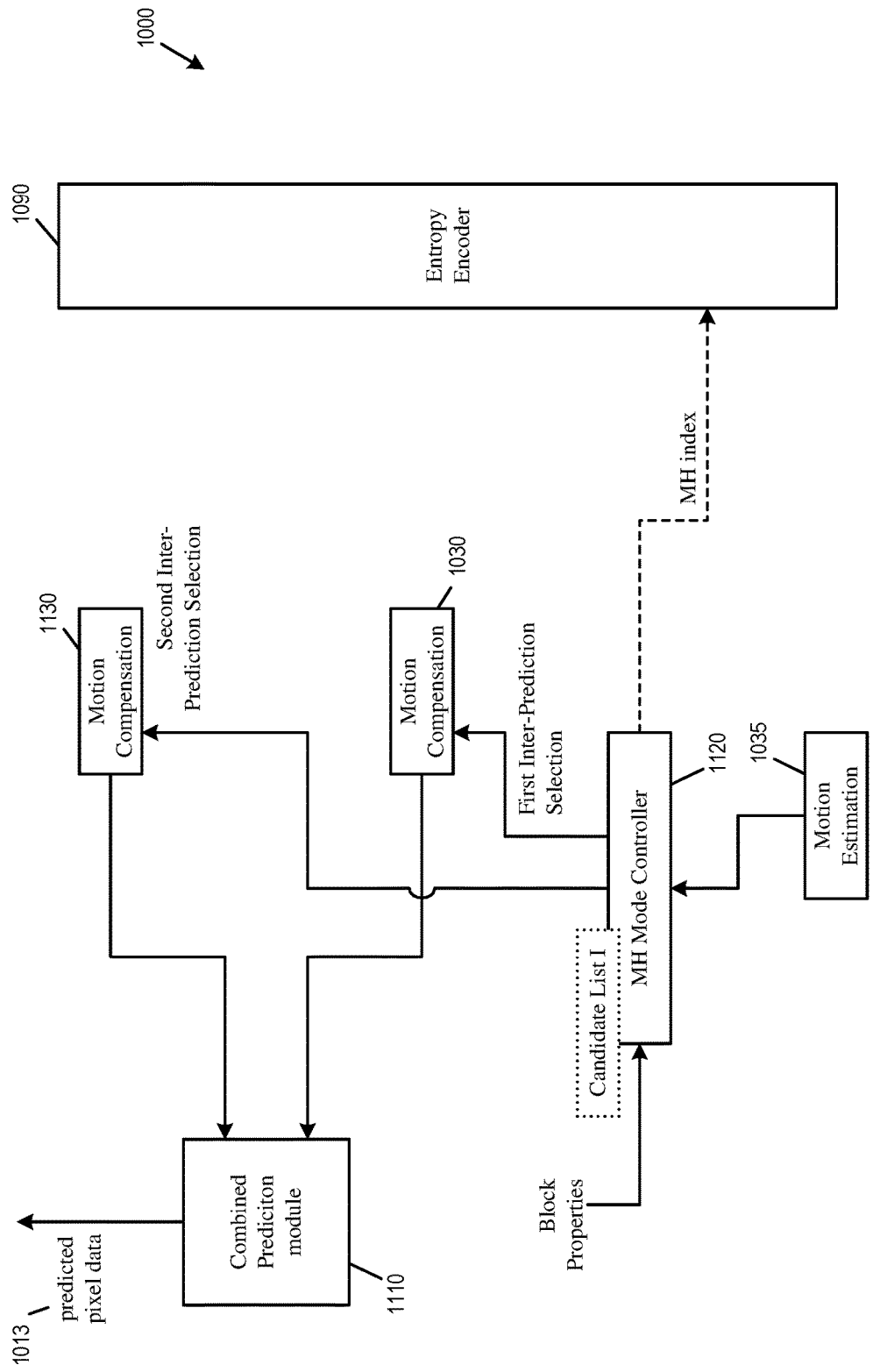
FIG. 11b illustrates portions of the video encoder that may implement MH mode for inter when encoding a block of pixels.

FIG. 11*b* illustrates portions of the video encoder 1000 that may implement MH mode for Inter when encoding a block of pixels. As illustrated, the video encoder 1000 implements the combined prediction module 1110, which produces the predicted pixel data 1013. The combined prediction module 1110 receives a first set of inter-prediction values from the motion compensation module 1030. The combined prediction module 1110 also receives a second set of inter-prediction values from the same motion compensation module 1030, or a secondary motion compensation module 1130. The two sets of motion information used for encoding a pixel block by the motion compensation module 1030 (and the secondary motion compensation module 1130) are saved in a storage for use by the same modules for subsequent blocks as candidates for merge mode or MH mode for inter.

The MH mode controller 1120 controls the operations of the motion compensation module 1030 (and/or the secondary motion compensation module 1130) when MH mode for Inter is enabled (for the block or a portion of the block). The MH mode controller 1120 creates a list of inter-prediction modes (Candidate List I). The candidates in the list are determined or identified based on various factors, including the size, width, or height of the current block, and/or a direction of a corresponding motion candidate.

The MH mode controller 1120 selects a first inter-prediction candidate and a second inter-prediction candidate from Candidate List I. The motion compensation module 1030 performs a first inter-prediction based on the first inter-prediction candidate selected from Candidate List I. The motion compensation module 1030 (or the secondary motion compensation module 1130) performs a second inter-prediction based on the second inter-prediction candidate selected from Candidate List I. The results of the first inter-prediction and the second inter-prediction are combined (e.g., averaged) at the combined prediction module 1110 to generate the predicted pixel data 1013.

The MH mode controller also provides information to the entropy encoder 1090 to insert into the bitstream as syntax elements. Such syntax elements may signal whether MH mode for Inter is turned on. Such syntax elements may also explicitly signal the selection of the first inter-prediction and the second inter-prediction candidates from Candidate list I for MH mode for inter. The syntax for signaling the selection of the first and second inter-prediction candidates may include one single index that selects the first inter-prediction candidates from Candidate List I and one single index that selects the second inter-prediction candidates from Candidate List I. The syntax for signaling the selection of the first and second inter-prediction candidates may include one single index that selects the two inter-prediction candidates from Candidate List I. The syntax for signaling the selection of the inter-prediction candidates may be omitted (implicit signaling) if Candidate List I has only one candidate.

Figure 12:
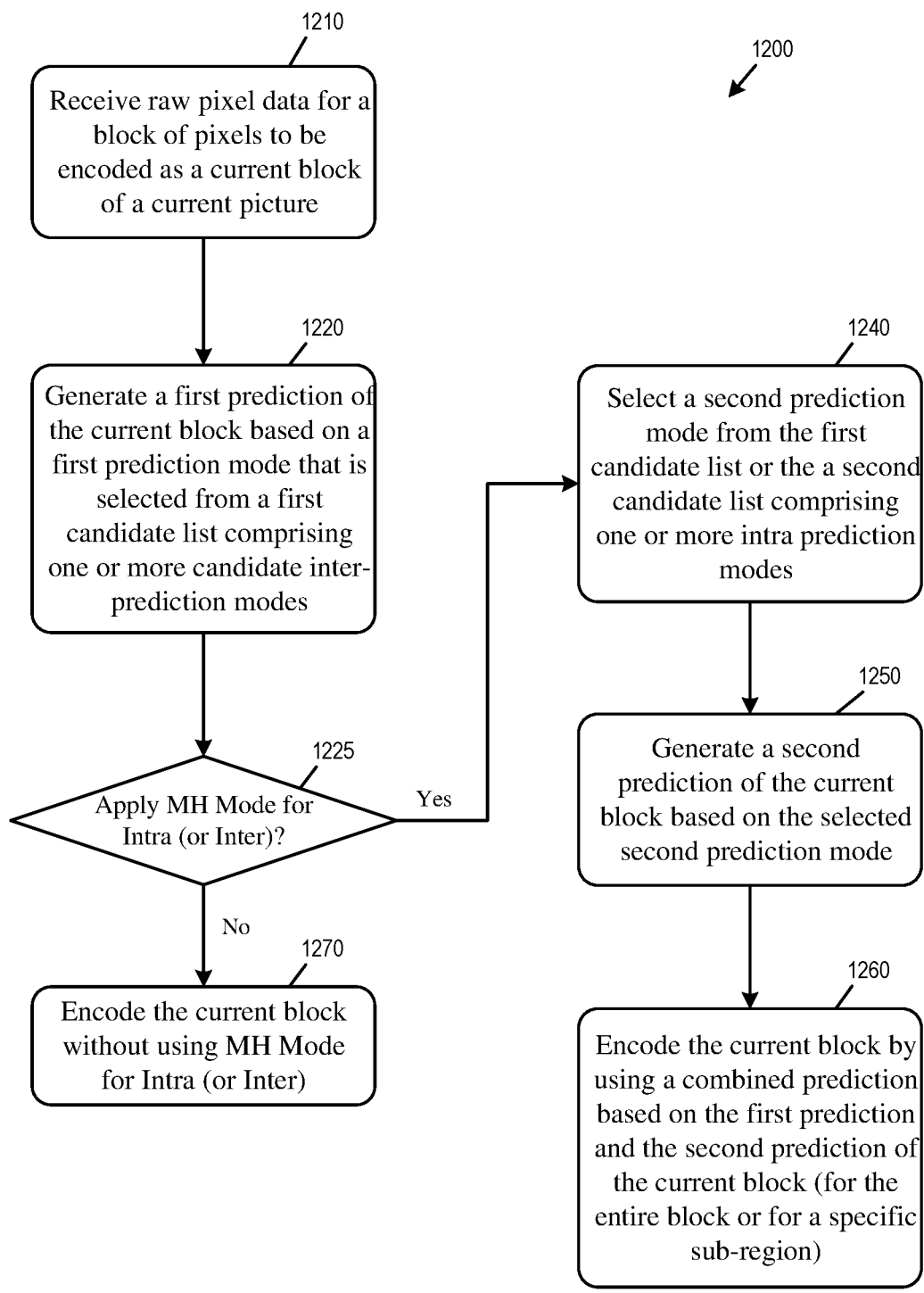
FIG. 12 conceptually illustrates a process that encodes a block of pixels using MH mode for intra or MH mode for inter.

FIG. 12 conceptually illustrates a process 1200 that encodes a block of pixels using MH mode for intra (or MH mode for inter). In some embodiments, one or more processing units (e.g., a processor) of a computing device implementing the encoder 1000 performs the process 1200 by executing instructions stored in a computer readable medium. In some embodiments, an electronic apparatus implementing the encoder 1000 performs the process 1200.

The encoder receives (at step 1210) raw pixel or video data for a block of pixels to be encoded as a current block of a current picture. The encoder generates (at step 1220) a first prediction of the current block based on a first prediction mode that is selected from a first candidate list. The first candidate list (e.g., Candidate List I) includes one or more candidate inter-prediction modes. The first candidate list may be the same as the merge candidate list, or a subset of the merge candidate list.

The encoder determines (at step 1225) whether MH mode for Intra (or MH mode for inter) maybe enabled according to width, height, or other size settings of the current block. In some embodiments, the encoder determine whether to enable MH mode for Intra (or MH mode for inter) based on whether the size of the block meets (e.g., greater than or equal to) an enabling threshold (e.g., 64). The size of the block may be determined according to the height and/or width of the block (e.g., area). If the size of the current block fails to meet (e.g., less than) the enabling threshold, the process proceeds to 1270. If the size of the block meets the enabling threshold, the process proceeds to 1240. In some embodiments, the encoder determines whether MH mode for Intra may be disabled according to width and/or height of the block. In some embodiments, the encoder determine whether to disable MH mode for Intra based on whether the width or the height of the block exceeds (e.g., greater than) a disabling threshold (e.g., 64). If so, the process proceeds to 1270. If the width and/or height of the block does not exceed (e.g., less than or equal to) the disabling threshold, the process proceeds to 1240.

At step 1240, the encoder selects a second prediction mode from the first candidate list or a second candidate list that includes one or more intra prediction modes. The encoder may identify candidates for the second candidate list (e.g., Candidate List II) based on a property of the block or a direction of the first prediction mode. For example, the ordering of candidates in the second candidate list may be determined based on the direction of the first prediction mode (e.g., when the motion candidate for the first prediction mode is from the left neighboring block, or the direction of the first intra-prediction mode in the second candidate list is horizontal.). For another example, the number of candidates in the second candidate list may be determined based on a width, height, or size of the current block. In some embodiments, if there is only one candidate in the second candidate list, the encoder selects the only candidate in the second candidate list as the second prediction mode without signaling it explicitly in the bitstream. The selection may be signaled by a code word that is to be included in the bitstream as a syntax element. Different code words are assigned to different candidates in the second candidate list based on the candidates' ordering in the list. The candidate that is first in the list is assigned a shortest code word. The process then proceeds to 1250.

At step 1250, the encoder generates a second prediction of the current block based on the selected second prediction mode by performing intra prediction. The encoder may omit tools that improves the result of normal intra prediction when performing intra prediction for MH mode for intra.

The encoder then encodes (at step 1260) the current block by using a combined prediction that is generated based on the first prediction and the second prediction of the current block. The combined prediction may be a weighted sum of the first prediction and the second prediction.

At step 1270, the encoder encodes the current block without using MH mode for Intra. In some embodiments, the current block is encoded by another prediction mode, e.g., merge mode without combined prediction. In some other embodiments, the process 1200 may be modified for encoding a block of pixels using MH mode for inter, which should not be limited in this disclosure.

Example Video Decoder

Figure 13:
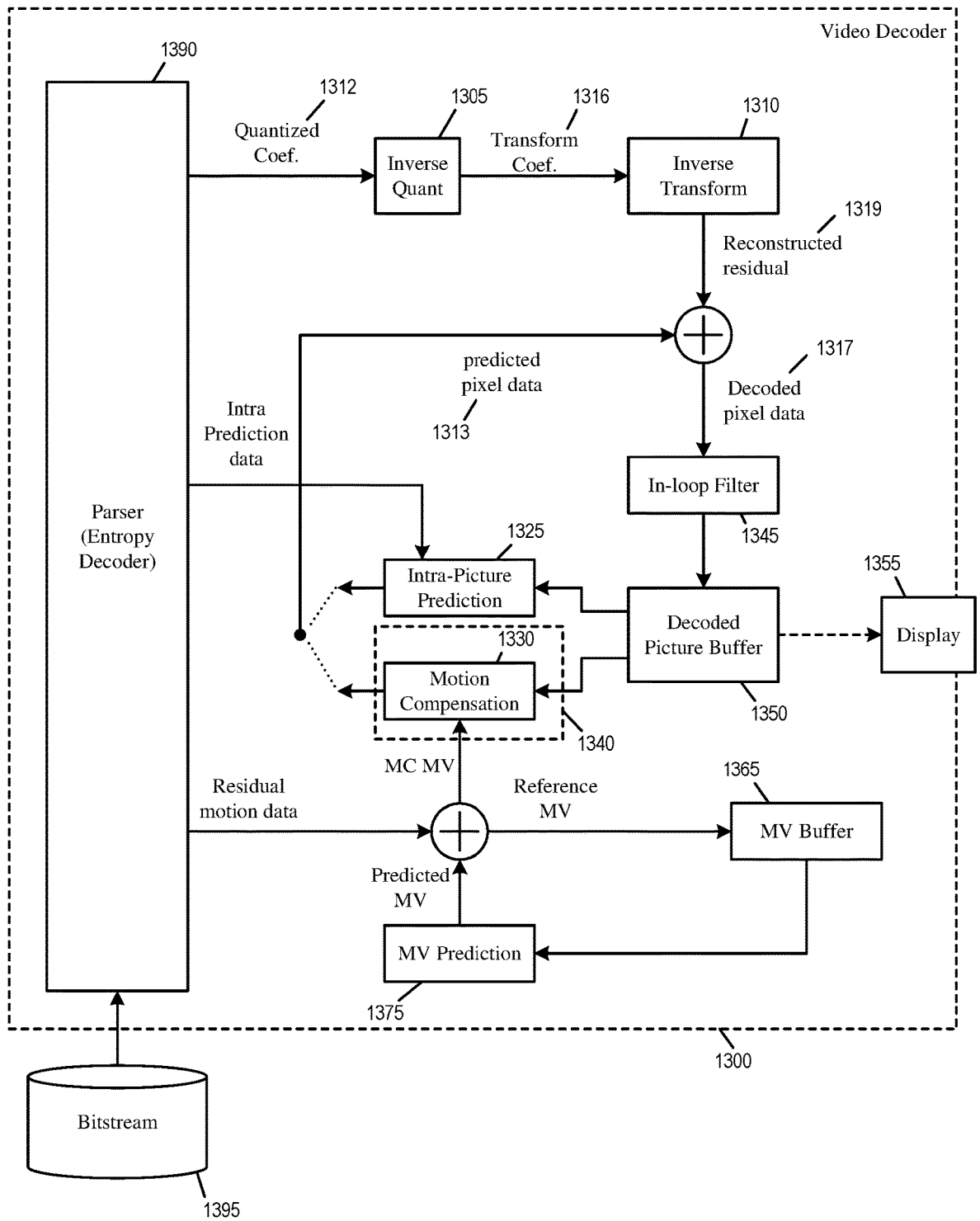
FIG. 13 illustrates an example video decoder that may implement MH mode for intra or MH mode for inter.

FIG. 13 illustrates an example video decoder 1300 that may implement MH mode (MH mode for intra and/or MH mode for inter). As illustrated, the video decoder 1300 is an image-decoding or video-decoding circuit that receives a bitstream 1395 and decodes the content of the bitstream into pixel data of video frames for display. The video decoder 1300 has several components or modules for decoding the bitstream 1395, including at least part of an inverse quantization module 1305, an inverse transform module 1310, an intra-prediction module 1325, a motion compensation module 1330, an in-loop filter 1345, a decoded picture buffer 1350, a MV buffer 1365, a MV prediction module 1375, and a parser 1390. The motion compensation module 1330 is part of an inter-prediction module 1340.

In some embodiments, the modules 1310-1390 are modules of software instructions being executed by one or more processing units (e.g., a processor) of a computing device. In some embodiments, the modules 1310-1390 are modules of hardware circuits implemented by one or more ICs of an electronic apparatus. Though the modules 1310-1390 are illustrated as being separate modules, some of the modules can be combined into a single module.

The parser 1390 (or entropy decoder) receives the bitstream 1395 and performs initial parsing according to the syntax defined by a video-coding or image-coding standard. The parsed syntax element includes various header elements, flags, as well as quantized data (or quantized coefficients) 1312. The parser 1390 parses out the various syntax elements by using entropy-coding techniques such as context-adaptive binary arithmetic coding (CABAC) or Huffman encoding.

The inverse quantization module 1305 de-quantizes the quantized data (or quantized coefficients) 1312 to obtain transform coefficients, and the inverse transform module 1310 performs inverse transform on the transform coefficients 1316 to produce reconstructed residual signal 1319. The reconstructed residual signal 1319 is added with predicted pixel data 1313 from the intra-prediction module 1325 or the motion compensation module 1330 to produce decoded pixel data 1317. The decoded pixels data are filtered by the in-loop filter 1345 and stored in the decoded picture buffer 1350. In some embodiments, the decoded picture buffer 1350 is a storage external to the video decoder 1300. In some embodiments, the decoded picture buffer 1350 is a storage internal to the video decoder 1300.

The intra-prediction module 1325 receives intra-prediction data from bitstream 1395 and according to which, produces the predicted pixel data 1313 from the decoded pixel data 1317 stored in the decoded picture buffer 1350. In some embodiments, the decoded pixel data 1317 is also stored in a line buffer (not illustrated) for intra-picture prediction and spatial MV prediction.

In some embodiments, the content of the decoded picture buffer 1350 is used for display. A display device 1355 either retrieves the content of the decoded picture buffer 1350 for display directly or retrieves the content of the decoded picture buffer to a display buffer. In some embodiments, the display device receives pixel values from the decoded picture buffer 1350 through a pixel transport.

The motion compensation module 1330 produces predicted pixel data 1313 from the decoded pixel data 1317 stored in the decoded picture buffer 1350 according to motion compensation MVs (MC MVs). These motion compensation MVs are decoded by adding the residual motion data received from the bitstream 1395 with predicted MVs received from the MV prediction module 1375.

The MV prediction module 1375 generates the predicted MVs based on reference MVs that were generated for decoding previous video frames, e.g., the motion compensation MVs that were used to perform motion compensation. The MV prediction module 1375 retrieves the reference MVs of previous video frames from the MV buffer 1365. The video decoder 1300 stores the motion compensation MVs generated for decoding the current video frame in the MV buffer 1365 as reference MVs for producing predicted MVs.

The in-loop filter 1345 performs filtering or smoothing operations on the decoded pixel data 1317 to reduce the artifacts of coding, particularly at boundaries of pixel blocks. In some embodiments, the filtering operation performed includes deblocking and/or sample adaptive offset (SAO). In some embodiment, the filtering operations include adaptive loop filter (ALF).

Figure 14A:
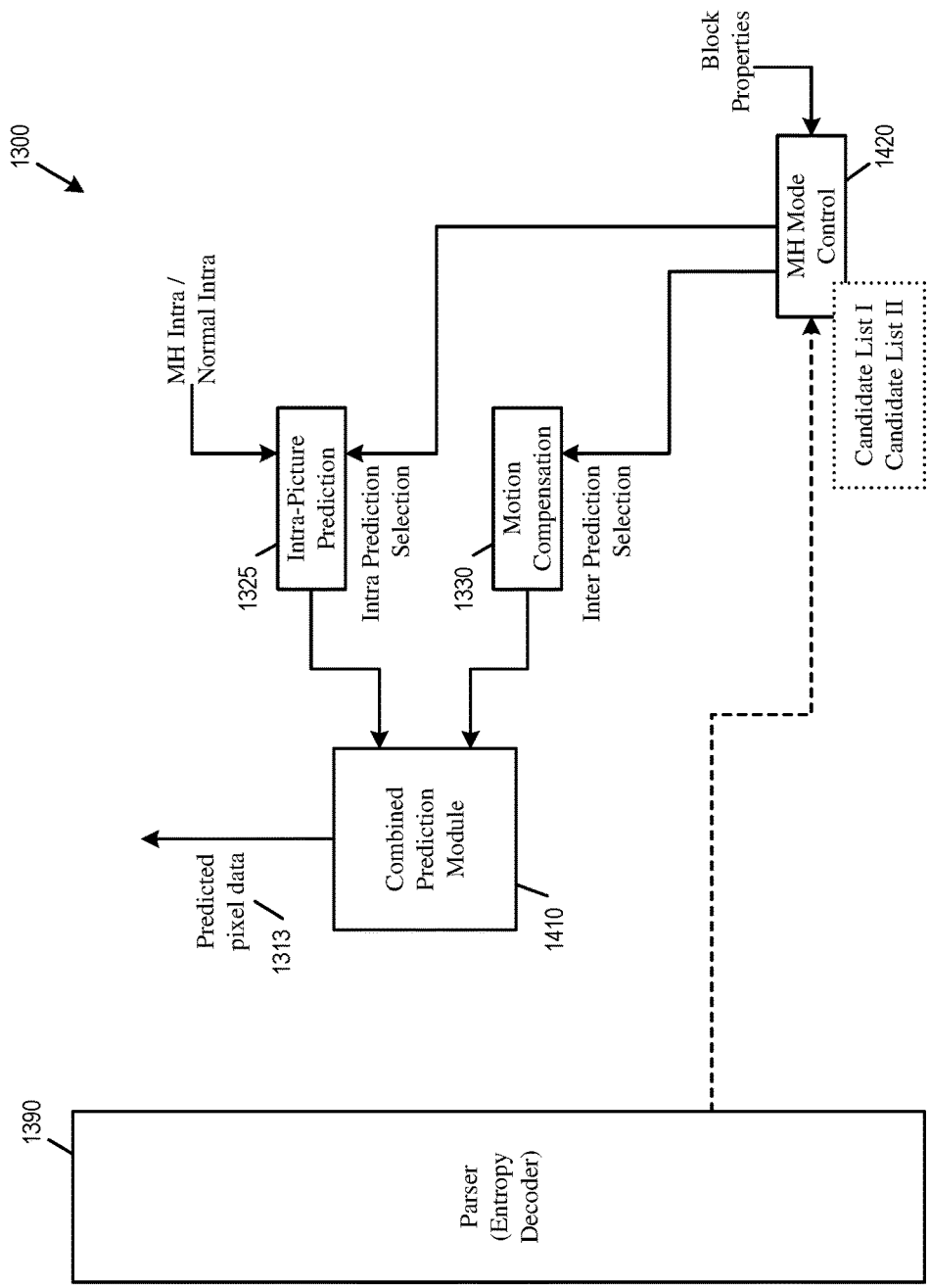
FIG. 14a illustrates portions of the video decoder that may implement MH mode for intra when decoding a block of pixels.

FIG. 14a illustrates portions of the video decoder 1300 that may implement MH mode for Intra when decoding a block of pixels. As illustrated, the video decoder 1300 implements a combined prediction module 1410, which produces the predicted pixel data 1313. The combined prediction module 1410 receives intra-prediction values generated by the intra-picture prediction module 1325. The combined prediction module 1410 also receives inter-prediction values from the motion compensation module 1330. The motion information and mode directions used for decoding a pixel block by the motion compensation module 1330 and the intra-picture prediction module 1325 are saved in a storage for use by the same modules for subsequent blocks as candidates for merge mode or MH mode.

A MH mode controller 1420 controls the operations of the intra-picture prediction module 1325 and the motion compensation module 1330 when MH mode for Intra is enabled (for the block or a portion of the block). The MH mode controller 1420 determines a list of inter-prediction modes (Candidate List I) and a list of intra-prediction modes (Candidate List II). The candidates of each list are determined or identified based on various factors, including the size, width, or height of the current block, and/or a direction of a corresponding motion candidate. The MH mode controller 1420 may also enable or disable MH mode for intra based on size, width, or height of the current block by enabling or disabling one or both of the intra prediction module 1325 and the motion compensation module 1330. In some embodiments, the intra prediction module 1325 uses a buffer whose size is reduced based on a threshold block width or height of for disabling MH mode for intra.

The MH mode controller 1420 selects an inter-prediction candidate from Candidate List I and an intra-prediction candidate from Candidate List II. The motion compensation module 1330 performs inter-prediction based on the candidate selected from Candidate List I. The intra-picture prediction module 1325 performs intra prediction based on the candidate selected from Candidate List II. The results of the inter-prediction and intra-prediction are combined (e.g., averaged) at the combined prediction module 1410 to generate the predicted pixel data 1313.

The MH mode controller 1420 receives information from the parser 1390 based on syntax elements in the bitstream. Such syntax elements may signal whether MH mode for intra is turned on. Such syntax elements may also explicitly signal the selection of the inter-prediction and intra-prediction candidates from candidate lists I and II for MH mode for intra. The syntax for signaling the selection of the inter-prediction and intra-prediction candidates may include one single index that selects the inter-prediction candidates from Candidate List I and one single index that selects the intra-prediction candidates from Candidate List II. The syntax for signaling the selection of the inter-prediction and intra-prediction candidates may include one single index that selects the inter-prediction and intra-prediction candidates from one combined list that includes both candidates list I and Candidate List II. The syntax for signaling the selection of the intra-prediction candidates and/or the inter-prediction candidate may be omitted (implicit signaling) if Candidate List I or Candidate List II has only one candidate.

The intra prediction module 1325 generates intra prediction result by using the selected intra prediction mode to identify a set of neighboring pixels and applying an interpolation filter to the identified set of neighboring pixels to produce a set of interpolated pixels. A signal (labeled as MH Intra/Normal Intra) controls whether the intra prediction module 1325 is used to generate intra prediction result for MH mode for intra or for normal intra prediction.

When the intra prediction module 1325 is used to produce intra prediction result for regular or normal intra prediction (i.e., not part of MH mode for intra), tools for improving intra prediction such as PDPC and wide angular intra prediction may also be used. For example, when the selected intra prediction mode is planar mode, for normal intra prediction, the intra prediction module 1325 may also perform reference availability check and substitution, reference sample filtering, horizontal planar predictor generation and averaging, and PDPC.

On the other hand, when the intra prediction module 1325 is used to generate intra prediction result for MH mode for intra, the intra prediction module 1325 uses a simplified intra prediction process. Such a simplified process may omit (at least some of) the filtering process, reduce the length of intra interpolation filter (e.g., having three or less taps instead of four taps), omit the tools for improving intra prediction such as PDPC, and wide angular intra prediction, etc. The simplified intra prediction process may compute planar mode by applying only a part (or a subset) or none of the four planar prediction steps (reference availability check and substitution, reference sample filtering, horizontal planar predictor generation and averaging, and PDPC). In some embodiments, the set of interpolated pixels is used as the result of intra prediction without further improvement for MH mode for intra.

Figure 14B:
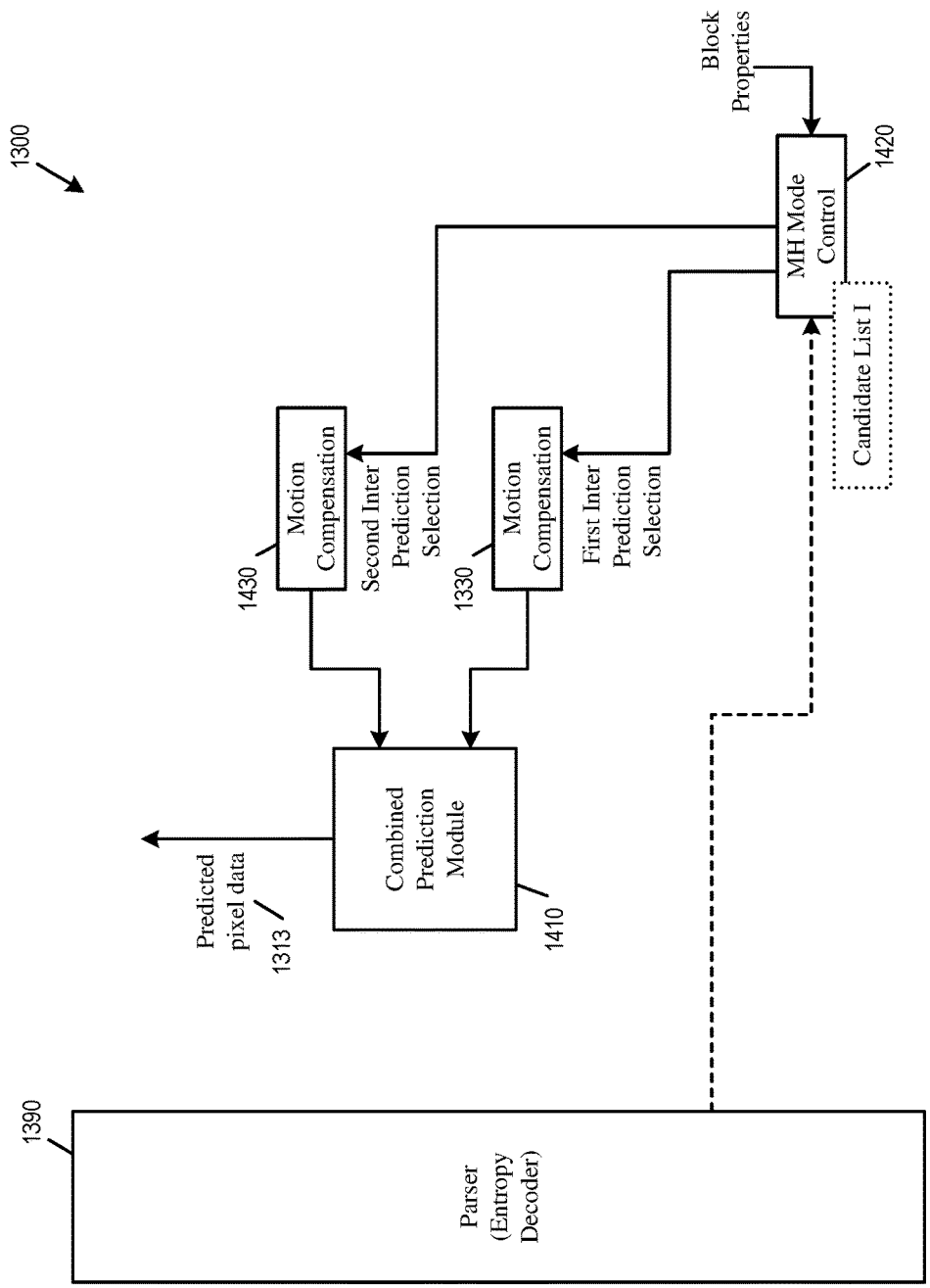
FIG. 14b illustrates portions of the video decoder that may implement MH mode for inter when decoding a block of pixels.

FIG. 14*b* illustrates portions of the video decoder 1300 that may implement MH mode for Inter when decoding a block of pixels. As illustrated, the video decoder 1300 implements a combined prediction module 1410, which produces the predicted pixel data 1313. The combined prediction module 1410 receives a first set of inter-prediction values from the motion compensation module 1330. The combined prediction module 1410 also receives a second set of inter-prediction values from the same motion compensation module 1330, or a secondary motion compensation module 1430. The two sets of motion information used for encoding a pixel block by the motion compensation module 1330 (and the secondary motion compensation module 1430) are saved in a storage for use by the same modules for subsequent blocks as candidates for merge mode or MH mode for inter.

The MH mode controller 1420 controls the operations of the motion compensation module 1330 (and/or the secondary motion compensation module 1430) when MH mode for Inter is enabled (for the block or a portion of the block). The MH mode controller 1420 creates a list of inter-prediction modes (Candidate List I). The candidates in the list are determined or identified based on various factors, including the size, width, or height of the current block, and/or a direction of a corresponding motion candidate (If the motion candidate is from the left neighboring block, the direction is horizontal).

The MH mode controller 1420 selects a first inter-prediction candidate and a second inter-prediction candidate from Candidate List I. The motion compensation module 1330 performs a first inter-prediction based on the first inter-prediction candidate selected from Candidate List I. The same motion compensation module 1330 (or the secondary motion compensation module 1430) performs a second inter-prediction based on the second inter-prediction candidate selected from Candidate List I. The results of the first inter-prediction and the second inter-prediction are combined (e.g., averaged) at the combined prediction module 1410 to generate the predicted pixel data 1313.

The MH mode controller receives information parsed by the entropy decoder 1390 from syntax elements in the bitstream. Such syntax elements may signal whether MH mode for Inter is turned on. Such syntax elements may also explicitly signal the selection of the first inter-prediction and the second inter-prediction candidates from Candidate list I for MH mode for inter. The syntax for signaling the selection of the first and second inter-prediction candidates may include one single index that selects the two inter-prediction candidates from Candidate List I. The syntax for signaling the selection of the inter-prediction candidates may be omitted (implicit signaling) if Candidate List I has only one candidate.

Figure 15:
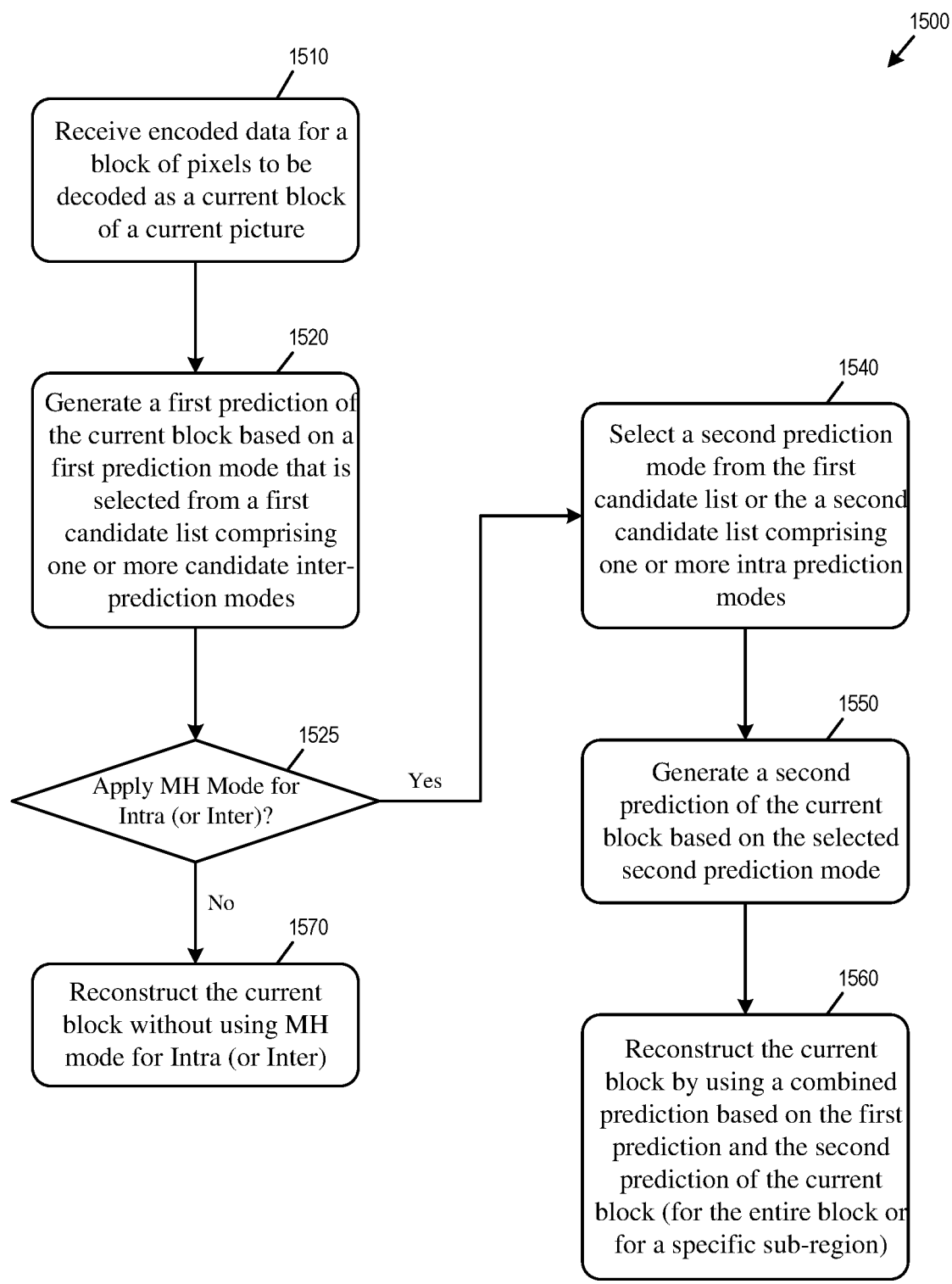
FIG. 15 each conceptually illustrates a process that decodes a block of pixels using MH mode for Intra or MH mode for Inter.

FIG. 15 conceptually illustrates a process 1500 that decodes a block of pixels using MH mode for Intra (or MH mode for Inter). In some embodiments, one or more processing units (e.g., a processor) of a computing device implementing the decoder 1300 performs the process 1500 by executing instructions stored in a computer readable medium. In some embodiments, an electronic apparatus implementing the decoder 1300 performs the process 1500.

The decoder receives (at step 1510) to-be-decoded data for a block of pixels to be decoded as a current block of a current picture. The decoder generates (at step 1520) a first prediction of the current block based on a first prediction mode that is selected from a first candidate list. The first candidate list (e.g., Candidate List I) includes one or more candidate inter-prediction modes. The first candidate list may be the same as the merge candidate list, or a subset of the merge candidate list.

The decoder determines (at step 1525) whether MH mode for Intra (or MH mode for inter) maybe enabled according to width, height, or other size settings of the current block. In some embodiments, the decoder determine whether to enable MH mode for Intra (or MH mode for inter) based on whether the size of the block meets (e.g., greater than or equal to) an enabling threshold (e.g., 64). The size of the block may be determined according to the height and/or width of the block (e.g., area). If the size of the current block fails to meet (e.g., less than) the enabling threshold, the process proceeds to 1570. If the size of the block meets the enabling threshold, the process proceeds to 1540. In some embodiments, the decoder determines whether MH mode for Intra may be disabled according to width and/or height of the block. In some embodiments, the decoder determine whether to disable MH mode for Intra based on whether the width or the height of the block exceeds (e.g., greater than) a disabling threshold (e.g., 64). If so, the process proceeds to 1570. If the width and/or height of the block does not exceed (e.g., less than or equal to) the disabling threshold, the process proceeds to 1540.

At step 1540, the decoder selects a second prediction mode from the first candidate list or a second candidate list that includes one or more intra prediction modes. The decoder may identify candidates for the second candidate list (e.g., Candidate List II) based on a property of the block or a direction of the first prediction mode. For example, the ordering of candidates in the second candidate list may be determined based on the direction of the first prediction mode (e.g., when the motion candidate for the first prediction mode is from the left neighboring block, or the direction of the first intra-prediction mode in the second candidate list is horizontal.). For another example, the number of candidates in the second candidate list may be determined based on a width, height, or size of the current block. In some embodiments, if there is only one candidate in the second candidate list, the decoder selects the only candidate in the second candidate list as the second prediction mode without signaling it explicitly in the bitstream. The selection may be signaled by a code word that is to be included in the bitstream as a syntax element. Different code words are assigned to different candidates in the second candidate list based on the candidates' ordering in the list. The candidate that is first in the list is assigned a shortest code word. The process then proceeds to 1550.

At step 1550, the decoder generates a second prediction of the current block based on the selected second prediction mode by performing intra prediction. The decoder may omit tools that improves the result of normal intra prediction when performing intra prediction for MH mode for intra.

The decoder then reconstructs (at step 1560) the current block by using a combined prediction that is generated based on the first prediction and the second prediction of the current block. The combined prediction may be a weighted sum of the first prediction and the second prediction.

At step 1570, the decoder reconstructs the current block without using MH mode for Intra. In some embodiments, the current block is decoded by another prediction mode, e.g., merge mode without combined prediction. In some other embodiments, the process 1500 may be modified for decoding a block of pixels using MH mode for Inter, which should not be limited in this disclosure.

Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 16:
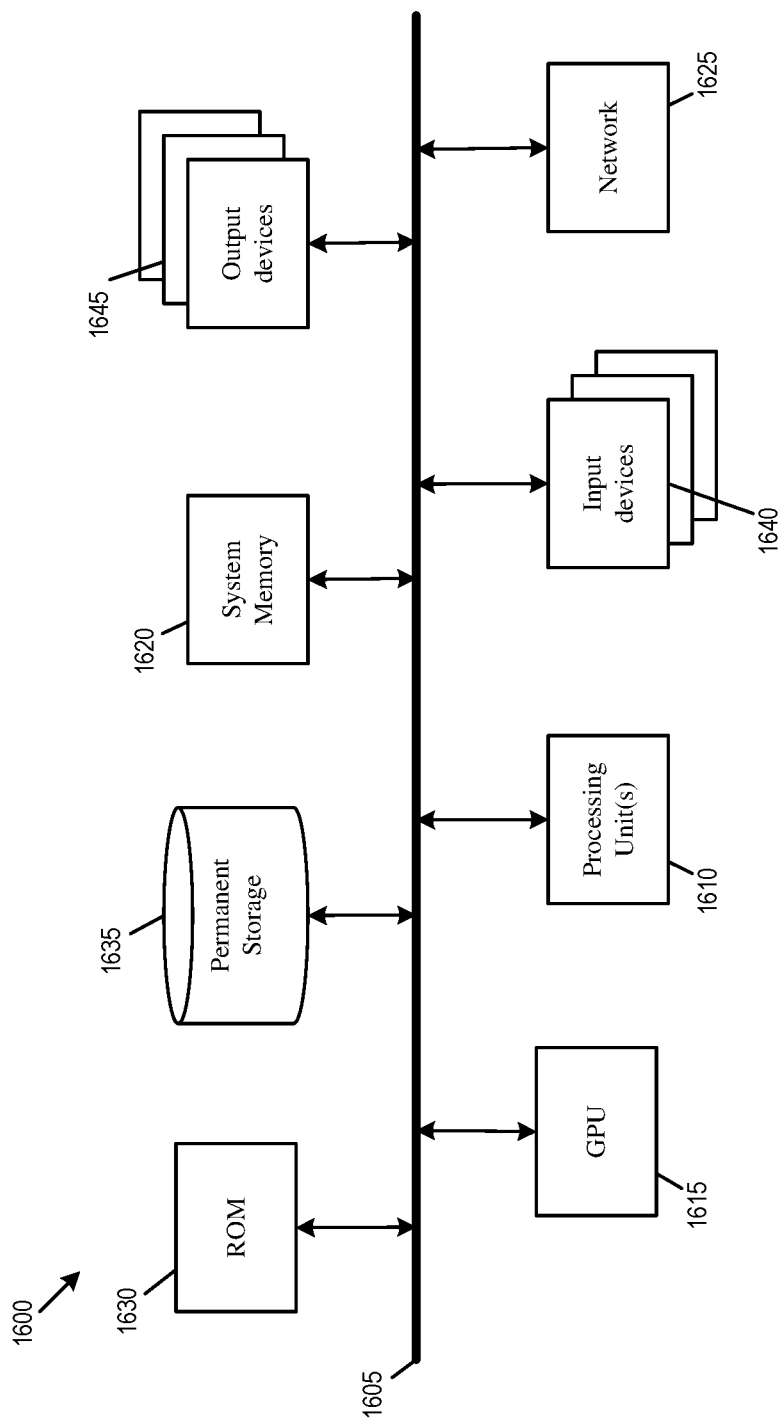
FIG. 16 conceptually illustrates an electronic system with which some embodiments of the present disclosure are implemented.

FIG. 16 conceptually illustrates an electronic system 1600 with which some embodiments of the present disclosure are implemented. The electronic system 1600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1600 includes a bus 1605, processing unit(s) 1610, a graphics-processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the GPU 1615, the read-only memory 1630, the system memory 1620, and the permanent storage device 1635.

From these various memory units, the processing unit(s) 1610 retrieves instructions to execute and data to process in order to execute the processes of the present disclosure. The processing unit(s) may be a single processor or a multi-core processor in different embodiments. Some instructions are passed to and executed by the GPU 1615. The GPU 1615 can offload various computations or complement the image processing provided by the processing unit(s) 1610.

The read-only-memory (ROM) 1630 stores static data and instructions that are used by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the present disclosure use a mass-storage device (such as a magnetic or optical disk and its corresponding disk drive) as the permanent storage device 1635.

Other embodiments use a removable storage device (such as a floppy disk, flash memory device, etc., and its corresponding disk drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor uses at runtime. In some embodiments, processes in accordance with the present disclosure are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alpha-numeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 12 and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to,"

the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
receiving to-be-decoded data from a bitstream for a block of pixels to be decoded as a current block of a current picture of a video;
generating a first prediction of the current block based on a first inter prediction mode;
determining a block size of the current block according to a width, a height, or both of the current block;
performing:
disabling a combined prediction mode with a selection for the current block responsive to the width or the height of the current block being greater than a threshold length; or
enabling the combined prediction mode with the selection for the current block responsive to the width and the height of the current block being not greater than the threshold length; and
when the combined prediction mode is enabled:
generating a second prediction of the current block based on an intra prediction mode or a second inter prediction mode depending on the selection;
generating a combined prediction for the current block based on the first prediction, the second prediction, and a combined-weight setting; and
reconstructing the current block by using the combined prediction,
wherein:
the first and second inter prediction modes are selected from a first candidate list having one or more inter prediction candidates, the first candidate list corresponding to a merging candidate list that includes at least one history-based merging candidate selected from a history-based motion vector predictor (HMVP) candidate list,
the intra prediction mode is inferred as a planar mode without parsing a syntax to indicate the intra prediction mode,
the first and second inter prediction modes are skip or merge and the merging candidate list is without subblock merging candidates,
the selection is explicitly indicated by a flag signaled/parsed for the current block to determine to use the intra prediction mode to generate the second prediction or to use the second inter prediction mode to generate the second prediction, and
in response of using the intra prediction mode to generate the second prediction, the combined-weight setting refers to selecting weights for the first prediction and the second prediction from multiple pre-defined weights comprising equal weights for the first prediction and the second prediction.

2. The method of claim 1, wherein the one or more inter prediction candidates of the first candidate list are identical to one or more candidates of a merge candidate list of the current block.

3. The method of claim 1, wherein the intra prediction mode is inferred without at least one of (i) reference availability check and substitution, (ii) reference sample filtering, (iii) horizontal planar predictor generation and averaging, and (iv) position dependent intra prediction combination (PDPC).

4. The method of claim 1, wherein the second prediction is generated without using position dependent intra prediction combination (PDPC) or angular intra prediction.

5. The method of claim 1, wherein the threshold length is 64.

6. The method of claim 1, wherein the HMVP candidate list is emptied responsive to the current block being a first block of a slice of the current picture.

7. A video encoding method comprising:
receiving raw pixel data for a block of pixels to be encoded as a current block of a current picture of a video into a bitstream;
generating a first prediction of the current block based on a first inter prediction mode;

determining a block size of the current block according to a width, a height, or both of the current block;
performing:
  disabling a combined prediction mode with a selection for the current block responsive to the width or the height of the current block being greater than a threshold length; or
  enabling the combined prediction mode with the selection for the current block responsive to the width and the height of the current block being not greater than the threshold length; and
when the combined prediction mode is enabled:
  generating a second prediction of the current block based on an intra prediction mode or a second inter prediction mode depending on the selection;
  generating a combined prediction for the current block based the first prediction, the second prediction, and a combined-weight setting; and
  encoding the current block into the bitstream by using the combined prediction,
wherein:
  the first and second inter prediction modes are is-selected from a first candidate list having one or more inter prediction candidates, the first candidate list corresponding to a merging candidate list that includes at least one history-based merging candidate selected from a history-based motion vector predictor (HMVP) candidate list,
  the intra prediction mode is inferred as a planar mode without parsing a syntax to indicate the intra prediction mode,
  the first and second inter prediction modes are skip or merge and the merging candidate list is without subblock merging candidates,
  the selection is explicitly indicated by a flag signaled/parsed for the current block to determine to use the intra prediction mode to generate the second prediction or to use the second inter prediction mode to generate the second prediction, and
  in response of using the intra prediction mode to generate the second prediction, the combined-weight setting refers to selecting weights for the first prediction and the second prediction from multiple pre-defined weights comprising equal weights for the first prediction and the second prediction.

8. An electronic apparatus comprising:
a video decoder circuit configured to perform operations comprising:
  receiving to-be-decoded data from a first bitstream for a first block of pixels to be decoded as a first current block of a first current picture of a first video;
  generating a first prediction of the first current block based on a first inter prediction mode;
  determining a block size of the first current block according to a width, a height, or both of the first current block;
  performing:
    disabling a combined prediction mode with a selection for the first current block responsive to the width or the height of the first current block being greater than a threshold length; or
    enabling the combined prediction mode with the selection for the first current block responsive to the width and the height of the first current block being not greater than the threshold length; and
  when the combined prediction mode is enabled:
    generating a second prediction of the first current block based on an intra prediction mode or a second inter prediction mode depending on the selection;
    generating a first combined prediction for the first current block based on the first prediction, the second prediction thereof, and a combined-weight setting; and
    reconstructing the first current block by using the first combined prediction; and
a video encoder circuit configured to perform operations comprising:
  receiving raw pixel data for a second block of pixels to be encoded as a second current block of a second current picture of a second video into a second bitstream;
  generating a first prediction of the second current block based on the inter prediction mode;
  determining a block size of the second current block according to a width, a height, or both of the second current block;
  performing:
    disabling the combined prediction mode with the selection for the second current block responsive to the width or the height of the second current block being greater than the threshold length; or
    enabling the combined prediction mode with the selection for the second current block responsive to the width and the height of the second current block being not greater than the threshold length; and
  when the combined prediction mode is enabled:
    generating a second prediction of the second current block based on the intra prediction mode or the second inter prediction mode depending on the selection;
    generating a second combined prediction for the second current block based on the first prediction, the second prediction thereof, and the combined-weight setting thereof; and
    encoding the second current block into the second bitstream by using the second combined prediction,
wherein:
  the first and second inter prediction modes are selected from a first candidate list having one or more inter prediction candidates, the first candidate list corresponding to a merging candidate list that includes at least one history-based merging candidate selected from a history-based motion vector predictor (HMVP) candidate list,
  the intra prediction mode is inferred as a planar mode without parsing a syntax to indicate the intra prediction mode,
  the first and second inter prediction modes are skip or merge and the merging candidate list is without subblock merging candidates,
  the selection is explicitly indicated by a flag signaled/parsed for the current block to determine to use the intra prediction mode to generate the second prediction or to use the second inter prediction mode to generate the second prediction, and
  in response of using the intra prediction mode to generate the second prediction, the combined-weight setting refers to selecting weights for the first prediction and the second prediction from multiple pre-defined weights comprising equal weights for the first prediction and the second prediction.

9. A video coding method comprising:
receiving data to be encoded or decoded as a current block of a current picture of a video,
generating a first prediction of the current block based on a first inter prediction mode;
determining a block size of the current block according to a width, a height, or both of the current block;
performing:
  disabling a combined prediction mode with a selection for the current block responsive to the width or the height of the current block being greater than a threshold length; or
  enabling the combined prediction mode with the selection for the current block responsive to the width and the height of the current block being not greater than a threshold length; and
when the combined prediction mode is enabled:
  generating a second prediction of the current block based on an intra prediction mode or the second inter prediction mode depending on the selection;
generating a combined prediction for the current block based on the first prediction, the second prediction thereof, and a combined-weight setting; and
using the combined prediction to reconstruct the current block or to encode the current block into a bitstream, wherein:
  the first and second inter prediction modes are selected from a first candidate list having one or more inter prediction candidates, the first candidate list corresponding to a merging candidate list that includes at least one history-based merging candidate selected from a history-based motion vector predictor (HMVP) candidate list,
  the intra prediction mode is inferred as a planar mode without parsing a syntax to indicate the intra prediction mode,
  the first and second inter prediction modes are skip or merge and the merging candidate list is without subblock merging candidates,
  the selection is explicitly indicated by a flag signaled/parsed for the current block to determine to use the intra prediction mode to generate the second prediction or to use the second inter prediction mode to generate the second prediction, and
  in response of using the intra prediction mode to generate the second prediction, the combined-weight setting refers to selecting weights for the first prediction and the second prediction from multiple pre-defined weights comprising equal weights for the first prediction and the second prediction.

* * * * *